(12) United States Patent
Tsuji

(10) Patent No.: US 6,332,598 B1
(45) Date of Patent: Dec. 25, 2001

(54) CARRIER MOUNTING STRUCTURE

(75) Inventor: Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/399,746

(22) Filed: Sep. 20, 1999

(30) Foreign Application Priority Data

Sep. 18, 1998 (JP) .................................................. 10-264911

(51) Int. Cl.$^7$ .................................................. F16M 13/00
(52) U.S. Cl. ........................................... 248/560; 248/918
(58) Field of Search .................................. 248/560, 638, 248/561, 615, 616, 573, 917, 918

(56) References Cited

U.S. PATENT DOCUMENTS

| | | | | |
|---|---|---|---|---|
| 2,174,209 | * | 9/1939 | Genest | 248/561 |
| 2,315,398 | * | 3/1943 | Clark | 248/561 |
| 2,470,185 | * | 5/1949 | Pietz | 248/573 |
| 3,460,210 | * | 8/1969 | Ellis | 248/561 |
| 5,996,960 | * | 12/1999 | Krajec | 248/638 |
| 6,000,670 | * | 12/1999 | Okamoto | 248/638 |

* cited by examiner

Primary Examiner—Alvin Chin-Shue
(74) Attorney, Agent, or Firm—Sughrue Mion, PLLC

(57) ABSTRACT

A carrier mounting structure which can smoothly mount a film carrier to a carrier stand and alleviate the effects on vibration isolating rubber. The carrier mounting structure, which includes an image reading device mounted to a main body of an image reading apparatus via vibration isolating rubber which alleviates the effects of vibration from the outside, and a carrier mounting portion which is formed at a reading position of the image reading device and to which a carrier having an image information carrying member loaded therein is mounted, includes: an upper surface of the main body of the image reading apparatus along which surface a bottom surface of the carrier is slid; a mounting surface of the carrier mounting portion, which is formed at a position higher than the upper surface of the main body of the image reading apparatus and to which the carrier is mounted; and an inclined surface formed at a corner portion of the carrier mounting portion and inclined toward the mounting surface of the carrier mounting portion from a position which is lower than the upper surface of the main body of the image reading apparatus.

9 Claims, 17 Drawing Sheets

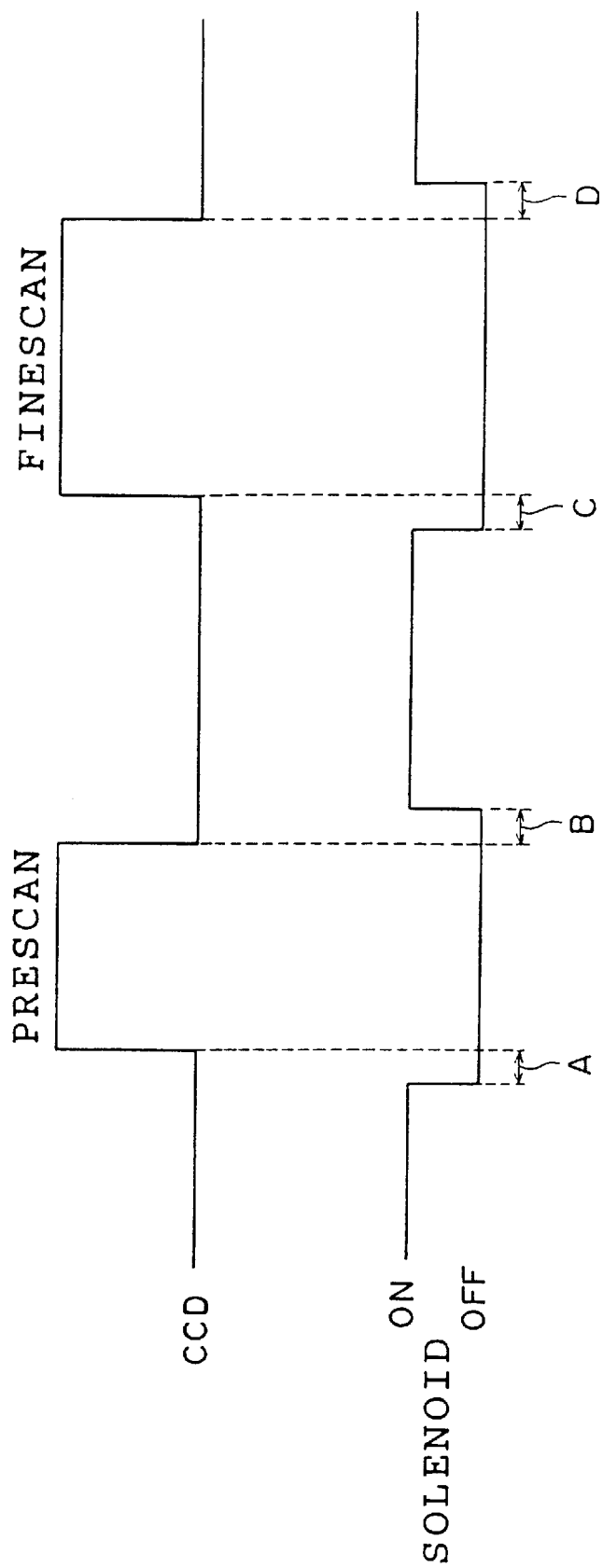

CARRIER MOUNTING STRUCTURE

BACKGROUND OF THE INVENTION

1. Field of the Invention

The present invention relates to a carrier mounting structure, of which a carrier in which an image information carrying member has been loaded is mounted to a carrier stand of an image reading means, in an image reading apparatus for preventing the carrier from vibrating.

2. Description of the Related Art

Conventionally, a vibration isolating structure has been employed in an image reading apparatus. In order to avoid influences of vibration from the outside on image reading means, vibration isolating rubber is used in the vibration isolating structure.

In general, the image reading apparatus optically reads images recorded on an image information carrying member, such as a photographic film, by an image reading means (for example, a reading sensor such as a CCD). Image processing, such as enlargement, reduction or various corrections, is effected on digital image data obtained from the reading by the image reading apparatus. Thereafter, an image can be formed on a recording material by laser light which is modulated in accordance with the image-processed digital image data.

In this way, when an image is optically read by a reading sensor such as a CCD, a very high reading accuracy is required for the image reading apparatus.

For example, however, when steady vibration (so-called motion vibration) is transmitted to the image reading means from the floor because of the installation location of the image reading apparatus or the like, or when vibration generated by an operator operating an operation section which effects operations of the image reading apparatus (so-called motion impact) is transmitted to the image reading means, deterioration in reading accuracy of images may be caused.

Therefore, image reading accuracy has been ensured by introducing a vibration isolating structure to the image reading means. The image reading means comprises a carrier stand, which supports a film carrier containing a photographic film or the like, and a lens unit including a CCD and the like.

Specifically, the influence of motion vibration and motion impact on the image reading apparatus has been avoided by connecting (supporting) a support frame including the carrier stand and a lens unit via vibration isolating rubber to a main body frame which forms the image reading apparatus.

However, when the film carrier is mounted to the carrier stand, the vibration isolating rubber may be excessively deformed and fractured by the impact.

SUMMARY OF THE INVENTION

In view of the aforementioned, an object of the present invention is to provide a member mounting structure which enables a carrier to be smoothly mounted to a carrier mounting portion and reduces the effect on the vibration isolating rubber.

A first aspect of the present invention is a carrier mounting structure which includes image reading means mounted to a main body of an image reading apparatus via a vibration isolating structure which alleviates the effects of vibration from the outside, and a carrier mounting portion which is formed at a reading position of the image reading means and to which a carrier having an image information carrying member loaded therein is mounted, the carrier mounting structure comprising: an upper surface of the main body of the image reading apparatus along which surface a bottom surface of the carrier is slid; a mounting surface of the carrier mounting portion, which is formed at a position different from the upper surface in a vertical direction and to which the carrier is mounted; and an inclined (slope) surface which guides the carrier from the upper surface to the mounting surface.

The operation of the first aspect of the present invention will be described.

When the carrier is mounted to the mounting surface of the carrier mounting portion by sliding the carrier along the upper surface of the main body of the image reading apparatus, the carrier is guided by the inclined surface which is provided at between the mounting surface of the carrier mounting portion and the upper surface of the main body of the image reading apparatus. Namely, the carrier is smoothly moved to and mounted to the mounting surface. If the mounting surface is higher than the upper surface in the vertical direction, the inclined surface is provided such that one end of inclined surface is at an end (corner) of the carrier mounting portion and the other end of inclined surface is at a position which is lower than the upper surface in the vertical direction, and therefore, an end portion of the carrier does not bump against the carrier mounting portion. In contrast, if the mounting surface is lower than the upper surface in the vertical direction, the inclined surface is provided such that the inclined surface is formed on the corner of the main body of the image reading apparatus and one end of the inclined surface is higher than the mounting surface in the vertical direction, therefore, the end portion of the carrier does not bump against the carrier mounting portion. Accordingly, it is possible to certainly prevent the carrier from bumping against the end portion of the carrier mounting portion and prevent the vibration isolating structure from being excessively deformed and fractured due to the impact when the carrier is slid to be mounted to the carrier mounting portion.

Particularly, in the case that the mounting surface is formed at a position higher than the upper surface of the main body of the image reading apparatus, the carrier mounted to the mounting surface does not contact the upper surface. Therefore, the effect of vibration from the outside on the carrier mounting portion and the carrier can be certainly avoided by the vibration isolating structure.

After the carrier is mounted to the carrier mounting portion, images can be read with a high reading accuracy by the image reading means which is isolated from vibration.

A second aspect of the present invention is a carrier mounting structure which includes image reading means mounted to a main body of an image reading apparatus via vibration isolating structure which alleviates the effects of vibration from the outside, and a carrier mounting portion which is formed at a reading position of the image reading means and to which a carrier having an image information carrying member loaded therein is mounted, the carrier mounting structure comprising securing means for temporarily securing the carrier mounting portion (image reading means) to the main body of the image reading apparatus.

The operation of the second aspect of the present invention will now be described.

In the present invention, when the carrier is mounted to the carrier mounting portion, the carrier mounting portion is temporarily secured to the main body of the image reading apparatus by the securing means. As a result, troublesome cases such as the following cases can be avoided: (1) a case in which the carrier mounting portion supported by the vibration isolating structure is vibrated when the carrier is mounted to the carrier mounting portion, thereby making it difficult to mount the carrier to the carrier mounting portion; and (2) a case in which the vibration isolating structure is excessively deformed and fractured due to the impact caused by the mounting of the carrier to the mounting portion.

A third aspect of the present invention is a carrier mounting structure according to the second aspect of the present invention, wherein the securing means comprises an engaged member formed at the carrier mounting portion (image reading means) and an engaging member provided at the main body of the image reading apparatus and formed so as to be insertable into and releasable from the engaged member.

The operation of the third aspect of the present invention will now be described.

The carrier mounting portion is temporarily secured to the main body of the image reading apparatus by inserting the engaging member, which is provided at the main body of the image reading apparatus, into the engaged member, which is formed at the carrier mounting portion. By inserting the engaging member into the engaged member only when the carrier is mounted to the carrier mounting portion, vibration of the carrier mounting portion, which is generated due to the impact of the mounting of the carrier, can be prevented. Thus, a case such that the carrier mounting portion is excessively vibrated (i.e., the vibration isolating structure is excessively deformed) by the impact generated when the carrier is mounted to the carrier mounting portion, and the vibration isolating structure is thus fractured can be prevented.

After the carrier is mounted to the carrier mounting portion, the vibration isolating operation of the vibration isolating structure is restored (reacted) with respect to the carrier mounting portion and the image reading means by releasing the engaging member from the engaged member. Accordingly, while an image recorded on the image information carrying member on the carrier is read, vibration of the image reading means and the carrier mounting portion (the carrier) is prevented. As a result, images can be read with a high reading accuracy.

A fourth aspect of the present invention is a carrier mounting structure which includes image reading means mounted to a main body of an image reading apparatus via vibration isolating structure which alleviates the effects of vibration from the outside, and a carrier mounting portion which is formed at a reading position of the image reading means and to which a carrier having an image information carrying member loaded therein is mounted, the carrier mounting structure comprising regulating means for restricting the amplitude of the vibration of the carrier mounting portion.

The operation of the fourth aspect of the present invention will now be described.

When the carrier is mounted to the carrier mounting portion, the carrier mounting portion is vibrated due to the impact generated at the time of the mounting of the carrier. Since the amplitude of the carrier mounting portion is restricted by the regulating member, the vibration isolating structure is not subjected to excessive deformation by the vibration of the carrier mounting portion. Namely, fracture of the vibration isolating structure can be certainly prevented.

A fifth aspect of the present invention is a carrier mounting structure according to the fourth aspect of the invention, wherein the regulating means includes a hole portion formed in one of the carrier mounting portion (image reading mens) or the main body of the image reading apparatus and a pin provided at one of the carrier mounting portion (image reading means) or the main body of the image reading apparatus and inserted into the hole portion, the pin having a cross-sectional area which is smaller than that of the hole portion.

The operation of the fifth aspect of the present invention will be described.

The pin provided at the main body of the image reading apparatus is inserted into the hole formed in the carrier mounting portion side. It is also possible that the pin provided at the carrier mounting portion side is inserted into the hole formed in the main body of the image reading apparatus. Since the cross-sectional area of the pin is smaller than that of the hole, clearance exists between the hole and the pin. The amount of the clearance determines the movable range of the carrier mounting portion. Accordingly, when the carrier is mounted to the carrier mounting portion, the amplitude of the carrier mounting portion is limited within a moderate range by appropriately setting the cross-sectional areas of the hole and the pin. As a result, a case such that the vibration isolating structure is excessively deformed and fractured by the carrier mounting portion being excessively vibrated can be prevented.

A sixth aspect of the present invention is a carrier mounting structure according to the first aspect of the present invention, wherein a slide member with a friction factor smaller than that of the inclined surface is adhered to the inclined surface.

The operation of the sixth aspect of the present invention will be described.

By adhering to the inclined surface the slide member with a friction factor smaller than that of the inclined surface, the carrier is slid along the slide member. Therefore, the carrier is guided more smoothly onto the mounting surface.

A seventh aspect of the present invention is a carrier mounting structure according to the third or fourth aspect of the present invention, wherein the securing means secures the image reading means to the main body of the image reading apparatus except when image information recorded on the image information carrying member is read.

The operation of the seventh aspect of the present invention will be described.

Except the time images are read, the image reading means is secured to the main body of the image reading apparatus by the securing means, thereby reducing the load on the vibration isolating structure. Accordingly, deterioration of the vibration isolating structure is restricted, thereby extending the life period in which the vibration isolating structure can be used.

BRIEF DESCRIPTION OF THE DRAWINGS

FIG. 17 is a timing chart showing an example of the timing of energization of the solenoid according to the second embodiment of the present invention.

DESCRIPTION OF THE PREFERRED EMBODIMENTS

Figure 1:
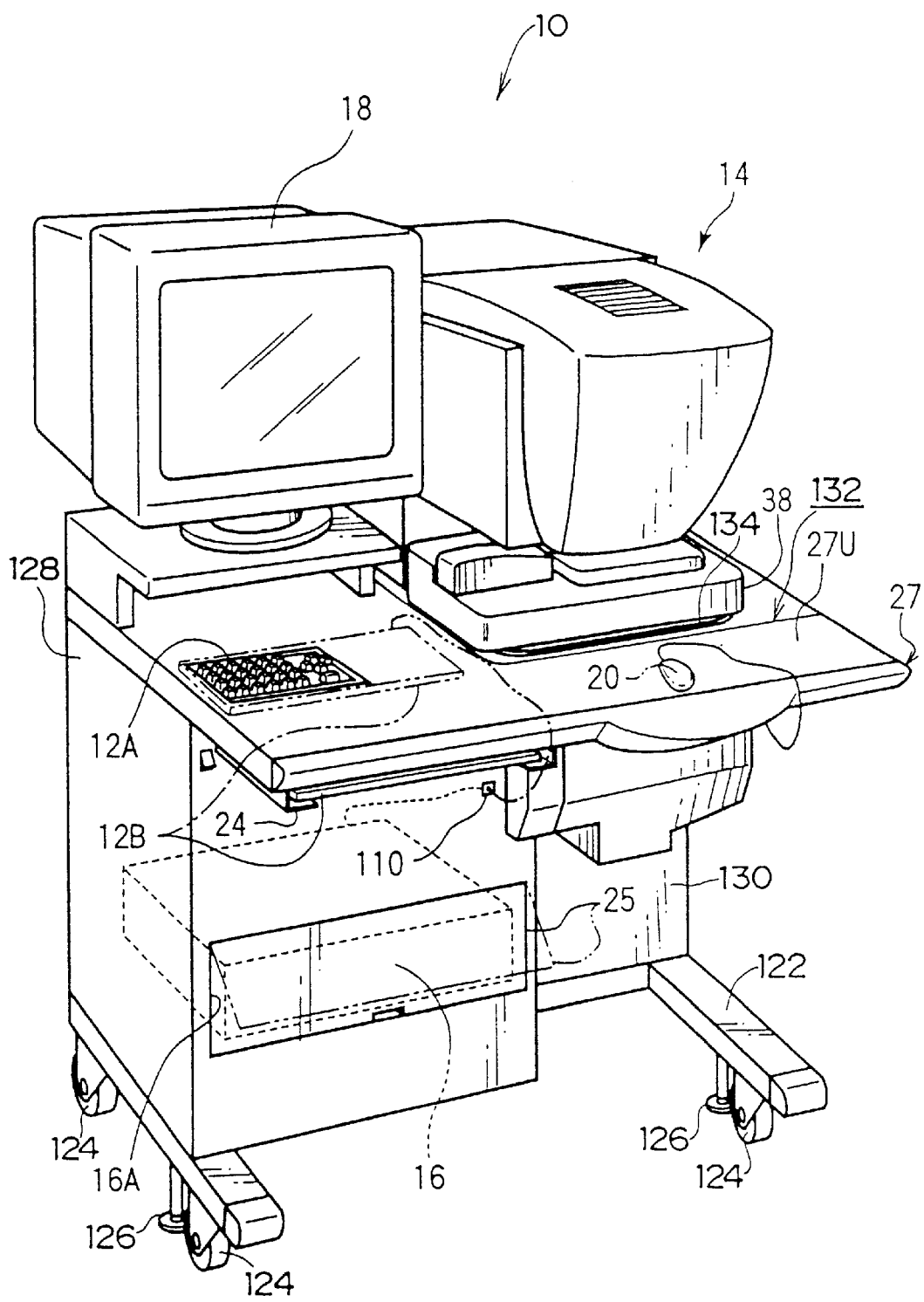
FIG. 1 is a perspective view showing an image reading apparatus according to the first through third embodiments of the present invention.

A description will now be given of an image reading apparatus 10 to which a carrier mounting structure according to the first embodiment of the present invention is applied. An overall structure of the image reading apparatus 10 will be described first with reference to FIGS. 1 through 7, and then the carrier mounting structure will be described in detail with reference to FIGS. 8 through 11.

Overall Structure of the Image Reading Apparatus

The image reading apparatus 10 includes a linear CCD scanner 14, a work table 27, an image processing section 16 provided at the work table 27, a mouse 20, two types of keyboards 12A and 12B, and a display 18.

The work table 27 has a substantially U-shaped installation frame 122 which is disposed on the floor. A plurality of casters 124 (four in the present embodiment) are mounted to the installation frame 122 so that the work table 27 can be freely moved on the floor F (see FIGS. 2 and 3). Further, stoppers 126 are mounted to the installation frame 122. By extending the stoppers 126 downwards so as to be pressed against the floor F, inadvertent movements of the work table 27 on the floor F can be prevented.

Two housings 128 and 130 are mounted to the installation frame 122. As can be seen in FIG. 1, one of the housings, i.e., the housing 128, is formed in an overhung shape so that the top surface thereof is substantially L-shaped in plan view, while the other housing, i.e., the housing 130, is formed in a predetermined shape so that the housing 130, together with the housing 128, forms a substantially rectangular shape in plan view. Further, a gap 132 having a substantial L-shape in plan view with a predetermined width is formed between the two housings 128 and 130. The gap 132 cuts a portion of a vibration transmission path provided at the housings 128 and 130.

The top surface of the housing 128 is a work surface 27U of the work table 27. One of the keyboards, i.e., the keyboard 12A, is accommodated and embedded in an accommodating portion provided by forming a concave portion at the work surface 27U. When not in use, the other keyboard, i.e., the keyboard 12B, is accommodated within a drawer 24 of the work table 27, and when in use, the keyboard 12B is taken out of the drawer 24 and is laid on the keyboard 12A. Further, in this state, the cord of the keyboard 12B is connected to a jack 110 which is connected to the image processing section 16.

The cord of the mouse 20 is connected through a hole 108, which is provided in the work table 27, to the image processing section 16.

The image processing section 16 is accommodated within an accommodating portion 16A provided at the work table 27, and is tightly shielded from the exterior by a door 25. The image processing section 16 can be taken out of the accommodating portion 16A by opening the door 25.

The linear CCD scanner 14 is used to read a film image recorded on a photographic film such as a negative film or a reversal film. The photographic film mention ed herein refers to the film which is subjected to developing processing such that negative images or positive images formed on the film are made visible after an object has been photographed. Examples of a photographic film whose film images can be read include a 135-size photographic film, a 110-size photographic film, and a photographic film with a transparent magnetic layer formed thereon (i.e., a 240-size photographic film: a so-called APS film), and 120-size and 220-size photographic films (Brownie size). The linear CCD scanner 14 reads the film image to be read as described above by a linear CCD, which will be described later, and outputs data on the read image to the image processing section 16.

The image processing section 16 is structured to allow input of image data outputted from the linear CCD scanner 14. Further, the image processing section 16 effects image processing including various corrections for the input image data and then outputs the corrected image data, as recording image data, to an unillustrated laser printer section.

Figure 2:
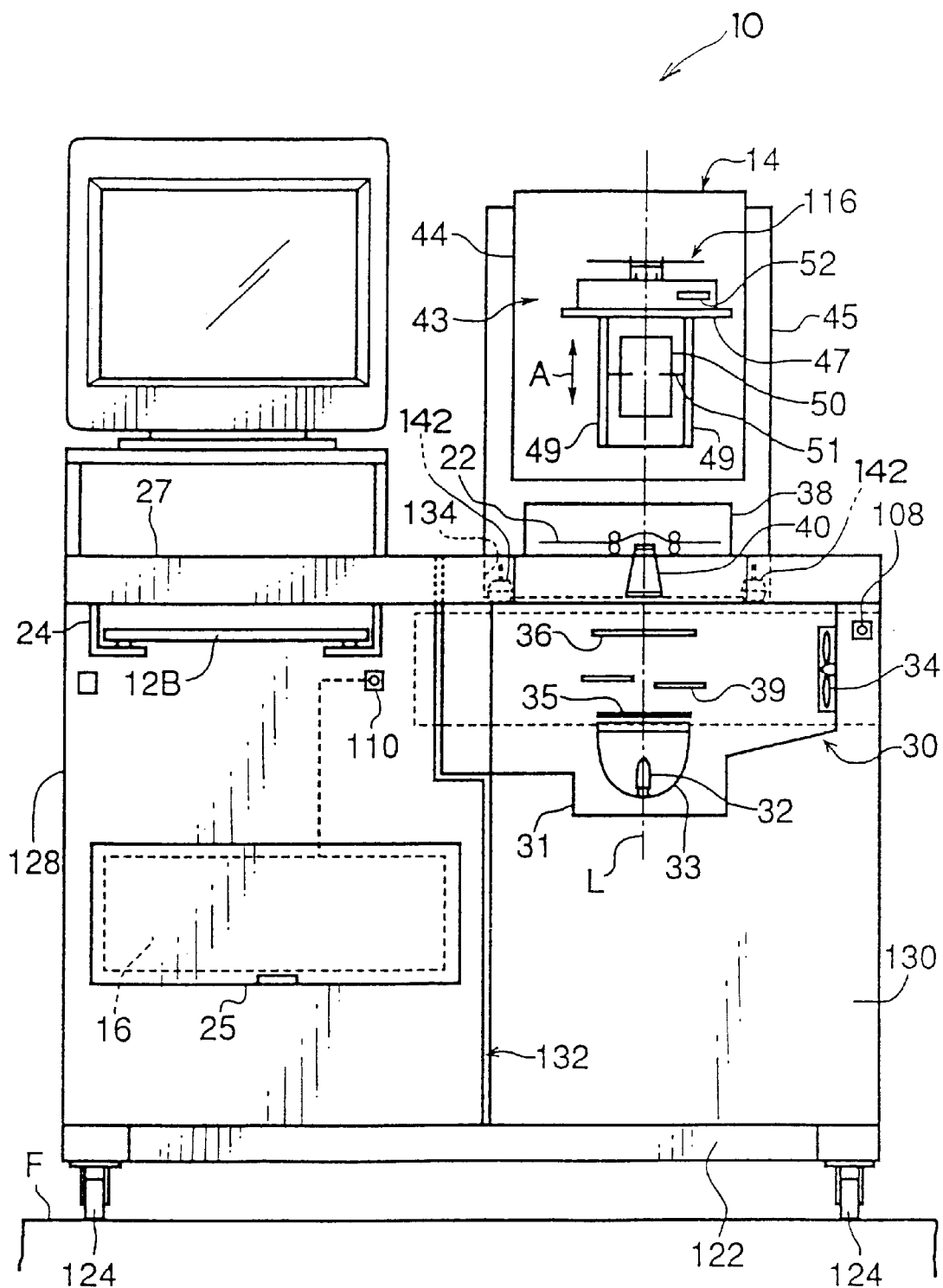
FIG. 2 is a front view showing a schematic structure of the image reading apparatus according to the first through third embodiments of the present invention.
Figure 3:
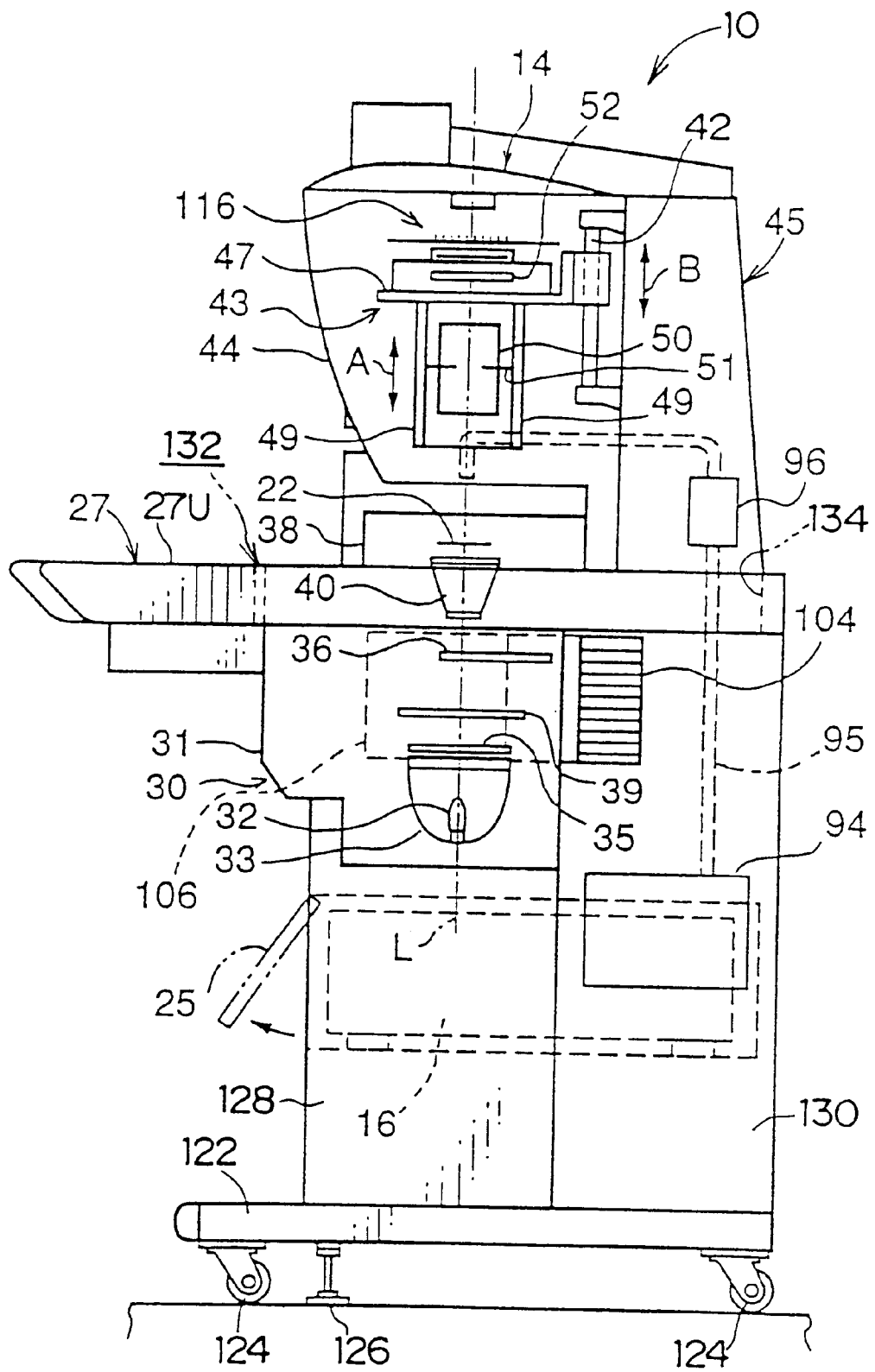
FIG. 3 is a side view showing the schematic structure of the image reading apparatus according to the first through third embodiments of the present invention.

As shown in FIGS. 2 and 3, an optical system of the linear CCD scanner 14 includes a light source section 30 disposed within the housing 130, a light diffusion box 40 supported by the housing 130, a film carrier 38 set on the housing 130, and a reading section 43 disposed at the side of the top surface of the housing 130 opposite to the side at which the light source section 30 is disposed.

The light source section 30 is accommodated within a metallic casing 31. A lamp 32 comprised of a halogen lamp, a metal halide lamp, or the like is disposed within the casing 31.

A reflector 33 is provided at the periphery of the lamp 32, and a portion of light emitted from the lamp 32 is reflected by the reflector 33 in a fixed direction. A plurality of fans 34 are provided on the sides of the reflector 33 (in FIG. 2, only one of the fans 34 is shown and the other fans are not shown). The fans 34 are operated when the lamp 32 is turned on, so as to prevent overheating of the interior of the casing 31.

A UV/IR cutting filter 35, a diaphragm 39, and a turret 36 are sequentially provided on the light emission side of the reflector 33 along an optical axis L of light reflected by the reflector 33. The UV/IR cutting filter 35 cuts light having wavelengths in the ultraviolet and infrared regions and so prevents an increase in the temperature of a photographic film 22, such that a high reading accuracy is ensured.

Figure 4A:
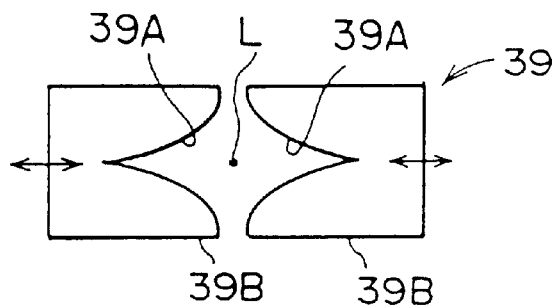
FIG. 4A is a plan view of a diaphragm of the image reading apparatus according to the first through third embodiments of the present invention.

As shown in FIG. 4A, the diaphragm 39 is formed from a pair of plate materials 39B with the optical axis L interposed therebetween and is provided to move slidably so that the pair of plate materials 39B move toward and away from each other. The pair of plate materials of the diaphragm 39 each has a notch 39A formed at one end of the plate material running from the one end toward the other end in the direction the diaphragm 39 is slid, so that the cross-sectional area of the plate material along the direction perpendicular to the sliding direction continuously varies. Further, these plate materials 39B are disposed in such a manner that the sides thereof with the notches 39A formed therein face each other. By slidably moving the pair of plate materials 39B so as to move toward and away from each other, the amount of light emitted from the lamp 32 and reflected from the reflector 33 is adjusted.

The turret 36 has a balance filter 36N for a negative film and a balance filter 36P for a reversal film fitted therein. In accordance with the type of the photographic film (a negative film/a reversal film), the turret appropriately sets the color components of the light which reaches the photographic film 22 and the reading section 43.

Thus, in the present embodiment having the above-described structure, either of the filters (36N, 36P) is disposed on the optical axis L in accordance with the type of the photographic film so as to form light having the desired light components. The amount of light passing through the diaphragm 39 is adjusted to a desired amount of light by the position of the diaphragm 39.

The light diffusion box 40 is formed in such a manner that, closer to the upper portion thereof, i.e., toward the photographic film 22, the light diffusion box 40 is made shorter in the direction the photographic film 22 is conveyed by the film carrier 38 (see FIG. 2) and is made longer in the direction perpendicular to the direction the photographic film 22 is conveyed (i.e., the transverse direction of the photographic film 22)(see FIG. 3). Further, light diffusion plates (not shown) are mounted on the light-entering side and the light-exiting side of the light diffusion box 40, respectively. Although the aforementioned light diffusion box 40 is used for a 135-size photographic film, light diffusion boxes formed in accordance with other types of photographic films are also prepared.

Light entering the light diffusion box 40 is, toward the film carrier 38 (i.e., the photographic film 22), made into slit light whose longitudinal direction coincides with the transverse direction of the photographic film 22, and further is made into diffused light by the light diffusion plates, and then exits the light diffusion box 40. Due to light exiting from the light diffusion box 40 being made into diffused light as described above, nonuniformity in the amount of light irradiated on the photographic film 22 is alleviated and a uniform amount of slit light is illuminated onto the film image. Further, even when scratches are present on the film image, the scratches are prevented from becoming conspicuous.

As in the case with the light diffusion box 40, a film carrier 38 is provided for each type of the photographic film 22 and is selected in accordance with the type of the photographic film 22.

An opening (not shown) is provided at respective positions of the top surface and the bottom surface of the film carrier 38, which positions correspond to the optical axis L. The opening is designed to be longer than the width of an image frame of the photographic film 22 in the transverse direction thereof. Slit light from the light diffusion box 40 is irradiated on the photographic film 22 through the opening provided in the bottom surface of the film carrier 38, and light transmitted through the photographic film 22 reaches the reading section 43 through the opening provided in the top surface of the film carrier 38.

The film carrier 38 includes an unillustrated guide which guides the photographic film 22 in such a manner that the photographic film 22 is curved in the longitudinal direction thereof at a position at which slit light from the light diffusion box 40 is irradiated (i.e., at the reading position) (see FIG. 2). With this structure, as shown in FIG. 3, a planar state of the photographic film 22 is ensured at the reading position without the photographic film 22 being curved in the transverse direction thereof.

The film carrier 38 is structured so as to be capable of conveying the photographic film 22 at various speeds in accordance with the density or other conditions of a film image to be scanned at the time of pre-scan (preliminary reading) or fine scan (main reading).

Figure 4B:
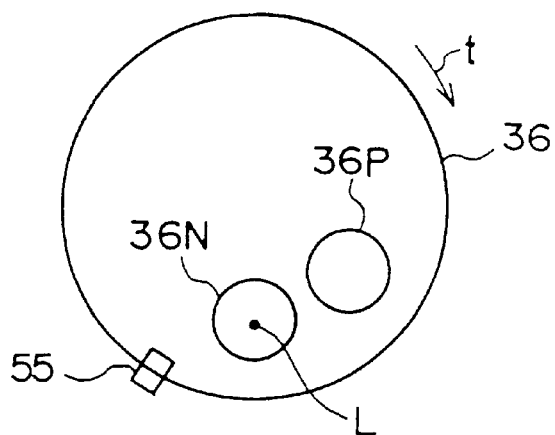
FIG. 4B is a plan view of a turret of the image reading apparatus according to the first through third embodiments of the present invention.
Figure 4C:
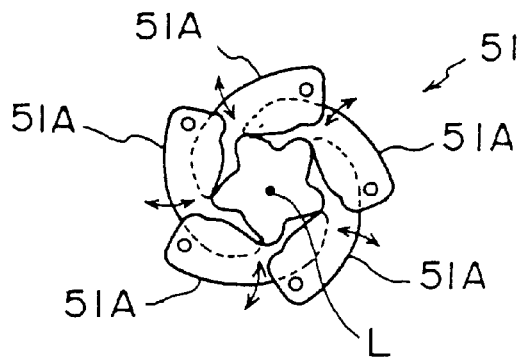
FIG. 4C is a plan view of a lens diaphragm of the image reading apparatus according to the first through third embodiments of the present invention.

A lens unit 50 is comprised of a plurality of lenses (the respective lenses are not shown), and a lens diaphragm 51 is provided between these lenses. As shown in FIG. 4C, the lens diaphragm 51 includes a plurality of diaphragm plates 51A each having a substantially C-shaped configuration. These diaphragm plates 51A are disposed evenly around the optical axis L and one end portion of each of the diaphragm plates 51A is supported by a pin so that the diaphragm plates 51A are each rotatable around the pin. The plurality of diaphragm plates 51A are connected together via a link (not shown), and when the driving force of a lens diaphragm driving motor (which will be described later) is transmitted to the diaphragm plates 51A, the diaphragm plates 51A rotate in the same direction. Accompanied with the rotation of the diaphragm plates 51A, an area around the optical axis L which is not shaded from light by the diaphragm plates 51A (the substantially star-shaped area shown in FIG. 4C) varies and the amount of light transmitted through the lens diaphragm 51 thereby varies.

A linear CCD 116 is structured in such a manner that a sensing portion, in which a large number of photoelectric conversion elements such as CCD cells or photodiodes are disposed in a row in the transverse direction of the photographic film 22 and an electronic shutter mechanism is disposed, is provided in each of three parallel lines which are spaced apart from each other and color separation filters of R, G, and B are respectively mounted on the light-incident side of the sensing portions (i.e., the linear CCD 116 is a so-called three-line color CCD). Accordingly, a separate optical axis is formed for each color of R, G, and B. A desired color component for each color is derived from the respective optical axes by the color separation filters of R, G, and B, respectively, so as to enter the photoelectric conversion elements. Further, a plurality of transfer portions each comprised of a large number of CCD cells are provided in the vicinity of each of the sensing portions so as to correspond to the respective sensing portions. The charge accumulated in each of the CCD cells of each sensing portion is sequentially transferred via the corresponding transfer portion.

Figure 4D:
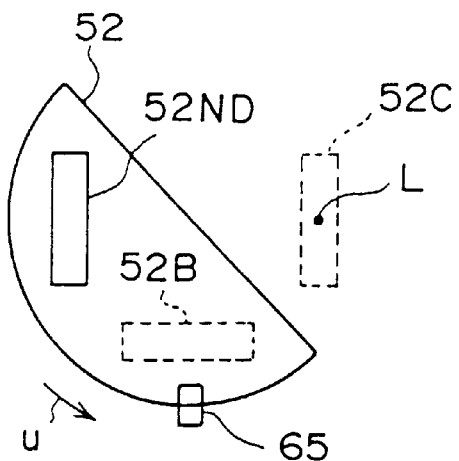
FIG. 4D is a plan view of a CCD shutter of the image reading apparatus according to the first through third embodiments of the present invention.

Further, a CCD shutter 52 is provided on the light-incident side of the linear CCD 116. As shown in FIG. 4D, an ND filter 52ND is fitted into the CCD shutter 52. The CCD shutter 52 is rotated in the direction indicated by arrow u so as to allow switching between a completely closed state in which light otherwise made incident on the linear CCD 116 is blocked for darkness correction (i.e., a portion 52B or the like, in which the ND filter 52ND is not fitted, is positioned at a position 52C including the optical axis L), a completely open state in which light is made incident on the linear CCD 116 for normal reading or lightness correction (i.e., the position shown in FIG. 4D), and a reduced light state in which light to be made incident on the linear CCD 116 is decreased by the ND filter 52ND for linearity correction (i.e., the ND filter 52ND is positioned at the position 52C).

As shown in FIG. 3, a compressor 94 is provided at the work table 27. The compressor 94 generates cooling air for cooling the photographic film 22. Cooling air generated by the compressor 94 is guided by a guiding pipe 95 and supplied to an unillustrated reading portion of the film carrier 38. As a result, an area of the photographic film 22 which is positioned at the reading position can be cooled. The guiding pipe 95 passes through a flow rate sensor 96 which detects the flow rate of cooling air.

Figure 5:
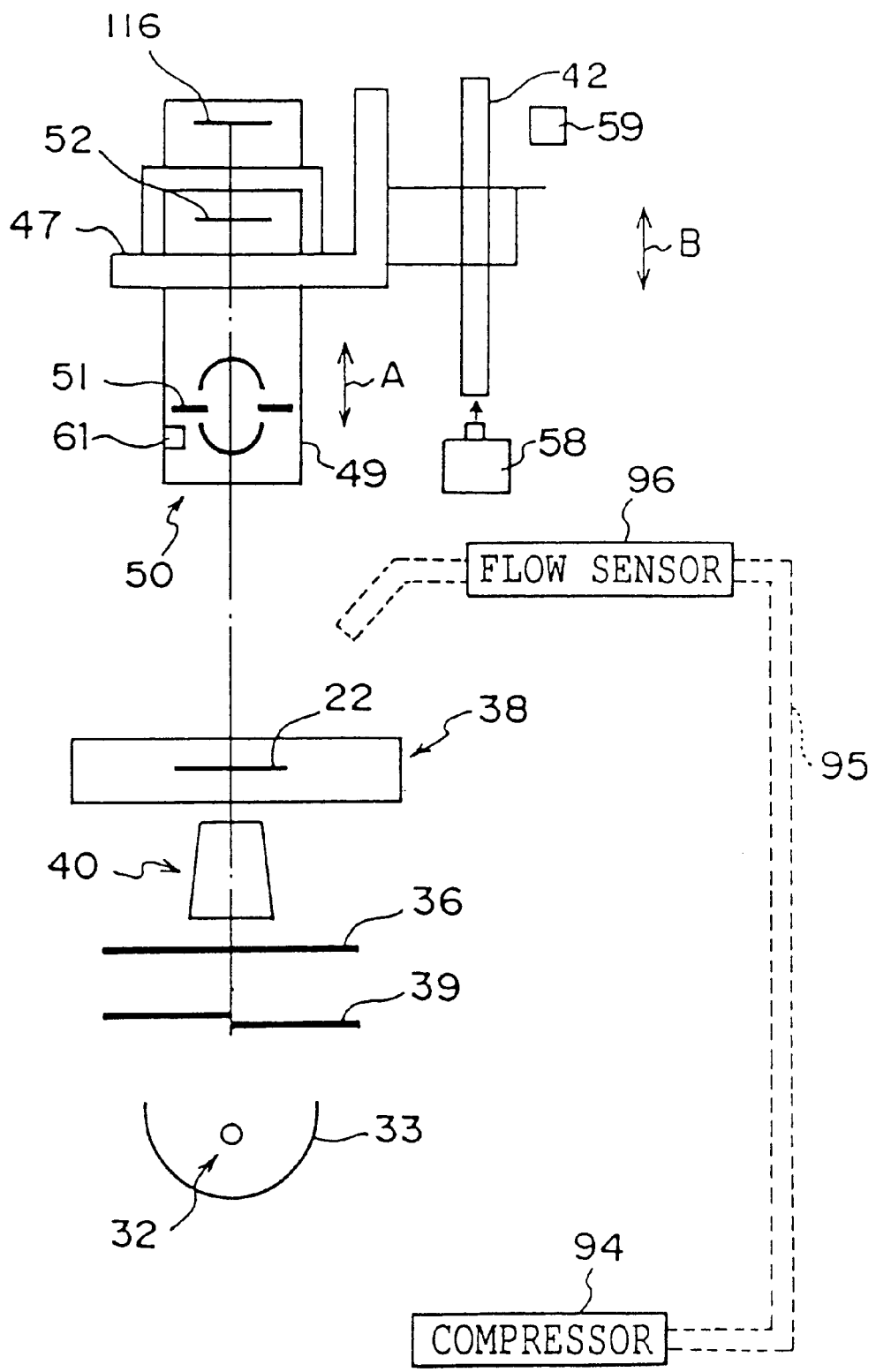
FIG. 5 is a schematic view showing a principal portion of an optical system of the image reading apparatus according to the first through third embodiments of the present invention.
Figure 6:
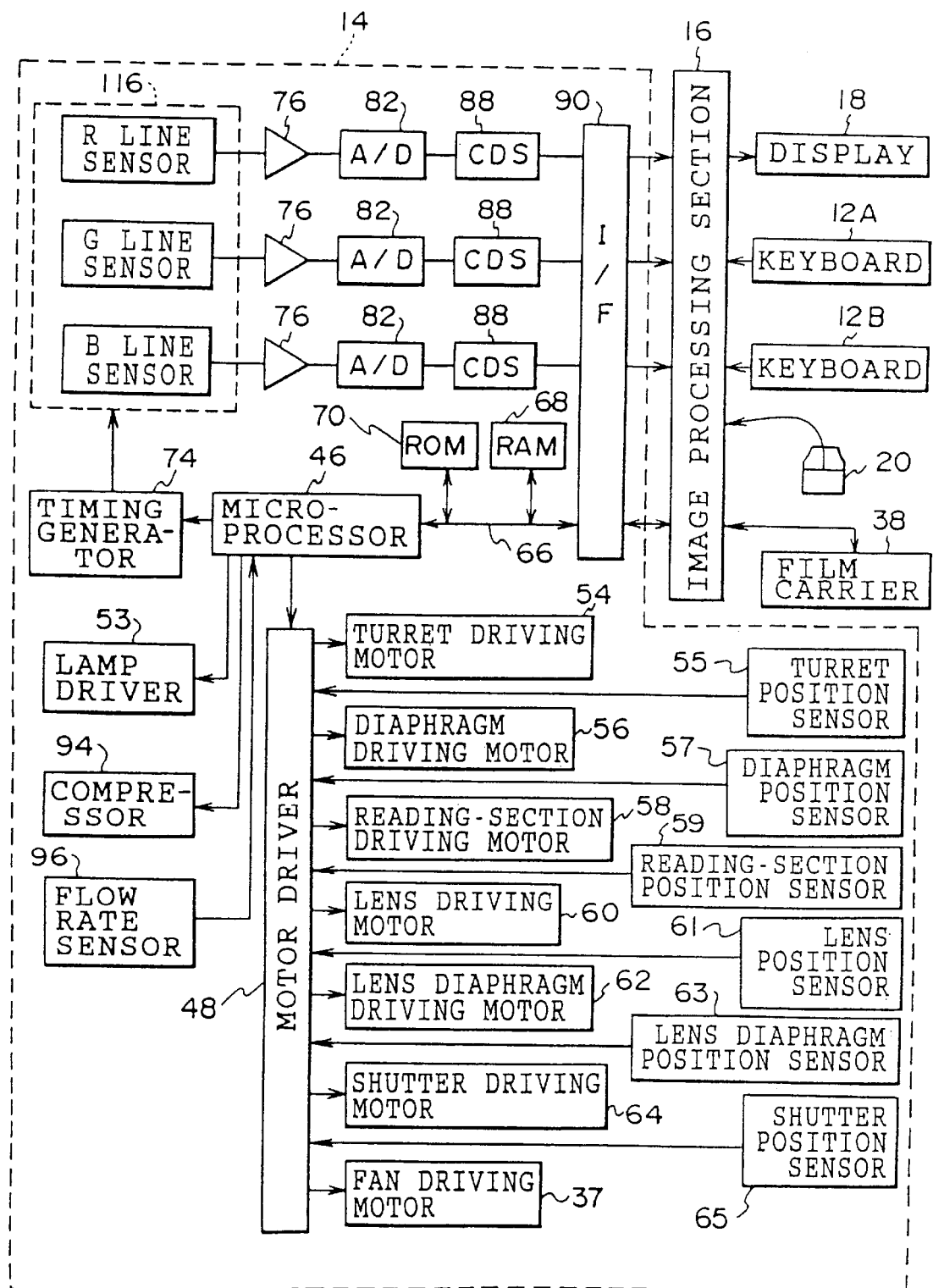
FIG. 6 is a block diagram showing a schematic structure of an electric system of the image reading apparatus according to the first through third embodiments of the present invention.

Referring to a principal portion of the optical system of the linear CCD scanner 14 shown in FIG. 5, a schematic structure of an electric system of the linear CCD scanner 14 and the image processing section 16 will be described using FIG. 6.

The linear CCD scanner 14 includes a microprocessor 46 which effects control of the entire linear CCD scanner 14. A RAM 68 (for example, an SRAM), and a ROM 70 (for example, a ROM whose stored contents are rewritable) are connected via a bus 66 to the microprocessor 46, and a lamp driver 53, the compressor 94, the flow rate sensor 96, and a motor driver 48 are also connected to the microprocessor 46. The lamp driver 53 turns a lamp 32 on and off in accordance with an instruction from the microprocessor 46. Further, at the time of reading a film image of the photographic film 22, the microprocessor 46 operates the compressor 94 to supply cooling air to the photographic film 22. The flow rate of cooling air is detected by the flow rate sensor 96, and the microprocessor 46 detects, if any, abonormalities.

Further, a turret driving motor 54 and a turret position sensor 55 are connected to a motor driver 48. As shown in FIG. 4B, the turret driving motor 54 drive to rotate the turret 36 in the direction indicated by arrow t in FIG. 4B so that either the balance filter 36N for negative films or the balance filter 36P for reversal films of the turret 36 is positioned on the optical axis L.

The turret position sensor 55 detects the base position (an unillustrated notch) of the turret 36.

Also connected to the motor driver 48 are a diaphragm driving motor 56, a diaphragm position sensor 57, a reading-section driving motor 58, a reading-section position sensor 59, a lens driving motor 60, a lens position sensor 61, a lens diaphragm driving motor 62, a lens diaphragm position sensor 63, a shutter driving motor 64, a shutter position sensor 65, and a fan driving motor 37. The diaphragm driving motor 56 allows sliding movement of the diaphragm 39, and the diaphragm position sensor 57 detects the position of the diaphragm 39. The reading-section driving motor 58 allows sliding movement of a loading stand 47 (i.e., the linear CCD 116 and the lens unit 50) along the guide rail 42, and the reading-section position sensor 59 detects the position of the loading stand 47. The lens driving motor 60 allows sliding movement of the lens unit 50 along supporting rails 49, and the lens position sensor 61 detects the position of the lens unit 50. The lens diaphragm driving motor 62 allows rotation of the diaphragm plates 51A of the lens diaphragm 51, and the lens diaphragm position sensor 63 detects the position of the lens diaphragm 51 (i.e., the position of the diaphragm plates 51A). The shutter driving motor 64 allows switching between the completely closed state, the completely open state, and the reduced light state of the CCD shutter 52, and the shutter position sensor 65 detects the position of the shutter 52. The fan driving motor 37 drives the fans 34.

During pre-scan and fine scan by the linear CCD 116, based on the respective positions of the turret 36 and the diaphragm 39, which are respectively detected by the turret position sensor 55 and the diaphragm position sensor 57, the microprocessor 46 drives the turret position sensor 57 to rotate the turret 36 and drives the diaphragm driving motor 56 to slidably move the diaphragm 39, thereby allowing adjustment of the light irradiated on a film image.

Moreover, based on the position of the lens unit 50 detected by the lens position sensor 61, the microprocessor 46 drives the lens driving motor 60 so as to slide the lens unit 50.

Further, the microprocessor 46 determines zoom magnification (reading magnification) in accordance with the size of a film image or depending on whether trimming is to be effected, and allows sliding movement of the loading stand 47 by the reading-section driving motor 58 based on the position of the loading stand 47 detected by the reading-section position sensor 59, so that the film image can be read by the linear CCD 116 at the determined zoom magnification. At this time, the microprocessor 46 operates the loading stand 47 and the lens unit 50 in an interlocking manner so that the distance between the film image and the lens unit 50, and the distance between the lens unit 50 and the linear CCD 116 satisfy a relationship of a conjugate length.

Further, when focusing control (automatic focusing control) is effected which allows the light receiving surface of the linear CCD 116 to coincide with an imaging position of the film image set by the lens unit 50, the microprocessor 46 allows sliding movement of only the loading stand 47 by the reading-section driving motor 58. The focusing control can be effected so that, for example, the contrast of a film image read by the linear CCD 116 becomes maximum (i.e., a so-called image contrast technique). Alternatively, the focusing control may also be effected based on a distance detected by a distance sensor instead of on film-image data, the distance sensor being provided to measure the distance between the photographic film 22 and the lens unit 50 (or the linear CCD 116) by using infrared radiation or the like.

A timing generator 74 is connected to the linear CCD 116. The timing generator 74 generates various timing signals (clock signals) for operating the linear CCD, A/D converters 82, which will be described later, and the like. Signal output ends of the linear CCD 116 are connected to the A/D converters 82 via amplifiers 76, and the signals outputted from the linear CCD 116 are amplified by the amplifiers 76 and are converted to digital data in the A/D converters 82.

The output ends of the A/D converters 82 are each connected to the image processing section 16 via a correlated double sampling circuit (CDS) 88 and an interface (I/F) circuit 90 in that order. The CDS 88 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in each of the CCD cells) are sequentially outputted, as scan image data, to the image processing section 16 via the I/F circuit 90.

Meanwhile, photometric signals of R, G, and B are outputted concurrently from the linear CCD 116, and therefore, three signal processing systems each including the amplifiers 76, the A/D converters, and the CDSs 88 are provided and image data of R, G, and B are concurrently inputted, as scan image data, to the image processing section 16 from the I/F circuit 90.

Further, the display 18, the keyboards 12A and 12B, the mouse 20, and the film carrier 38, all of which were described above, are also connected to the image processing section 16.

Figure 7:
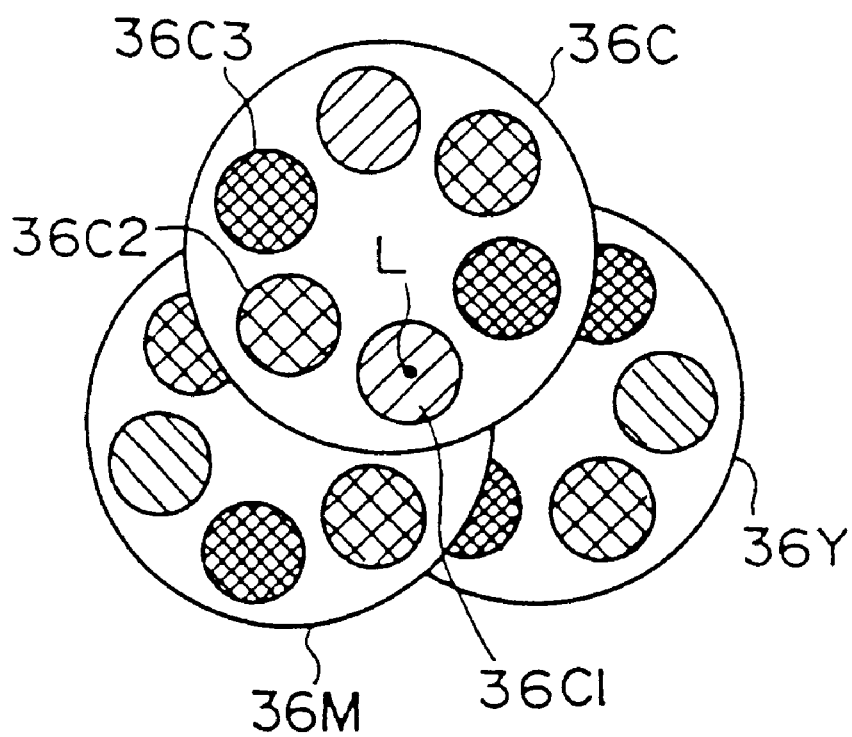
FIG. 7 is a plan view showing a modified example of the turret of the image reading apparatus according to the first through third embodiments of the present invention.

Further, the turret is not limited to the above-mentioned turret (see FIG. 4B). As shown in FIG. 7, the combination of a turret 36C for cyan filters which absorb red light, a turret 36M for magenta filters which absorb green light, and a turret 36Y for yellow filters which absorb violet light may also be used. A plurality of cyan filters 36C1, 36C2, and 36C3 each having a different density are fitted into the turret 36C. The density increases in the order of the cyan filters 36C1, 36C2, and 36C3. The other turrets 36M and 36Y have a similar structure. Further, each of the turrets 36C, 36M, and 36Y is rotatably supported so that the selected filters of the respective turrets are superposed on the optical axis L.

Construction of the Carrier Mounting Structure

Next, the carrier mounting structure will be described in detail with reference to FIGS. 8 through 11.

Figure 9:
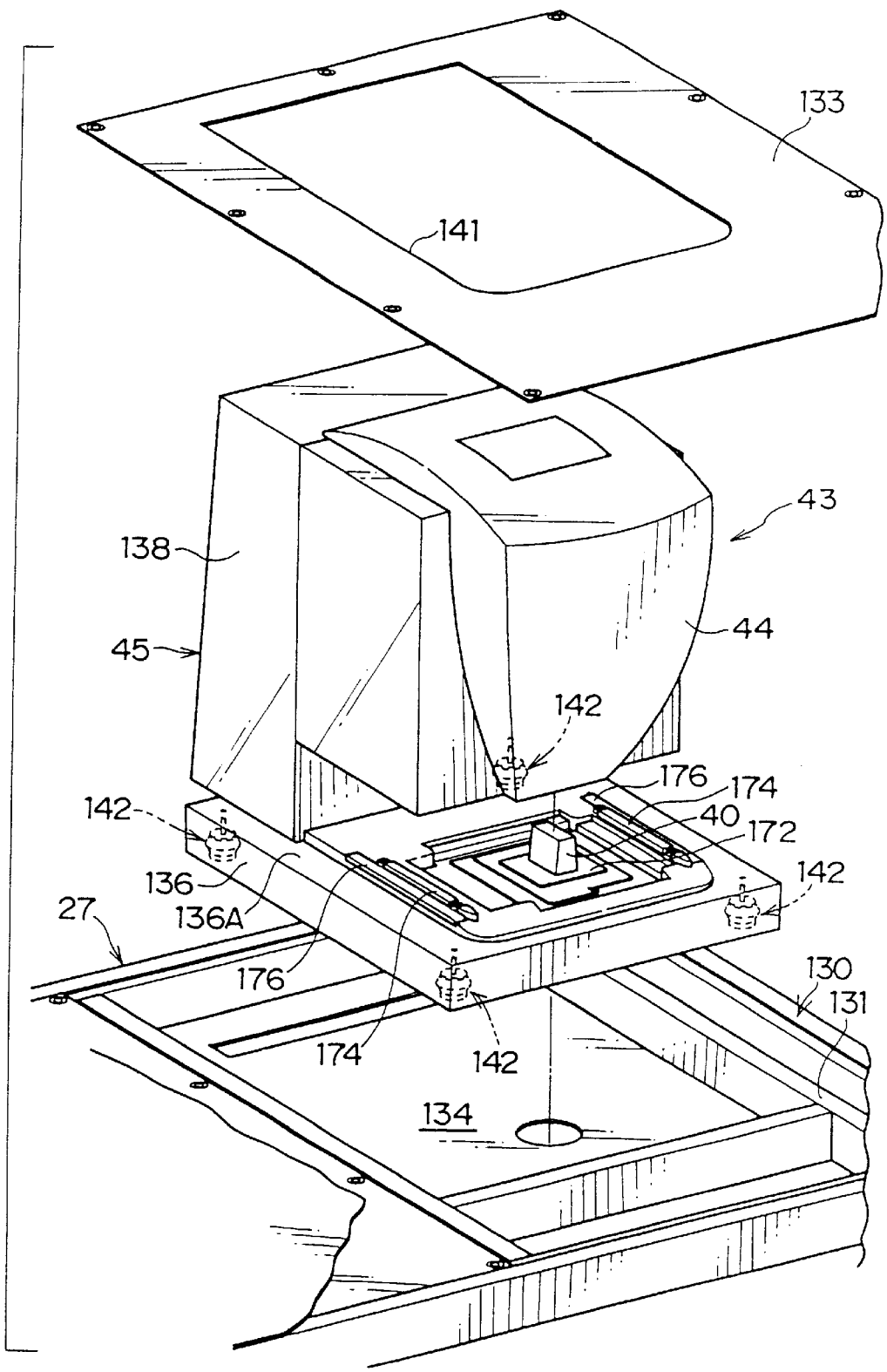
FIG. 9 is an exploded perspective view showing the carrier mounting structure in the image reading apparatus according to the first embodiment of the present invention.

As shown in FIG. 9, the upper portion of the work table 27 includes a housing main body frame 131 which forms the housing 130, and a top plate 133 disposed on the top of the housing main body frame 131.

A concave portion 134 is formed at the top surface of the work table 27, and a support frame 45 is disposed in the concave portion 134. Further, formed in the top plate 133 is an opening 141, corresponding to the concave portion 134, which is substantially rectangular in shape and somewhat larger than a frame 136. The frame 136 will be described later.

The support frame 45 has the frame 136 formed in a flat, substantial rectangular-parallelepiped-box shape with the bottom surface thereof being open, and a frame body 138 fixed to an upper plate 136A of the frame 136. Moreover, a casing 44 formed in a substantial box shape is fixed to the frame body 138.

Figure 8:
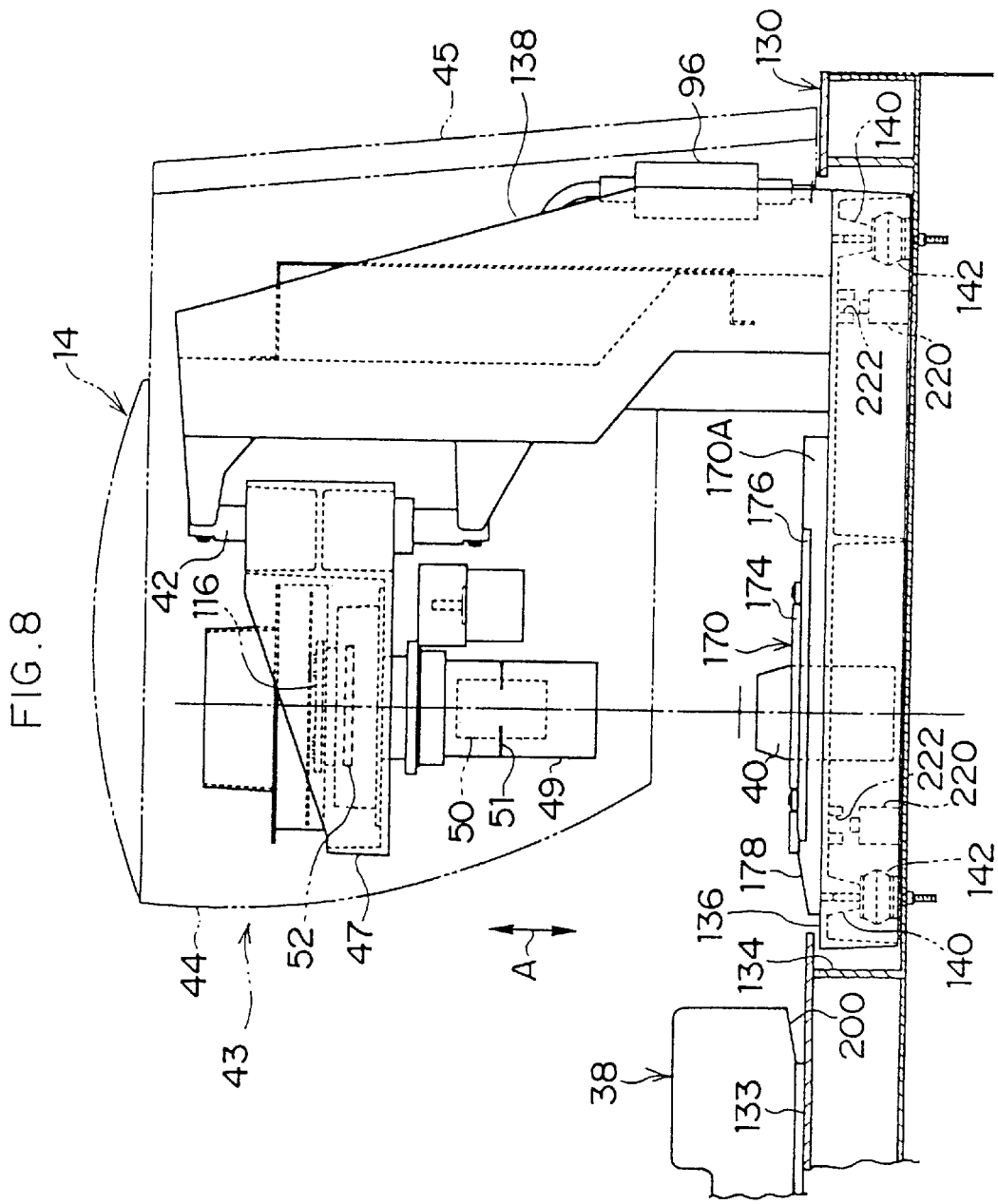
FIG. 8 is an overall schematic view showing a carrier mounting structure in the image reading apparatus according to the first embodiment of the present invention.

As shown in FIG. 8, the loading stand 47 is provided within the casing 44. The linear CCD 116 is mounted on the top surface of the loading stand 47.

The loading stand 47 is supported by the guide rail 42 mounted to the frame body 138 in such a manner as to move slidably in the directions in which the loading stand 47 moves toward and away from the work table 27 (i.e., in the directions indicated by the arrow A) so that a conjugate length can be ensured at the time of change of magnification or automatic focusing.

The plurality of supporting rails 49 hang down from the loading stand 47. In order to carry out a change of magnification such as reduction or enlargement, the lens unit 50 is supported by the supporting rails 49 in such a manner as to move slidably in the directions toward and away from the work table 27 (i.e., in the directions indicated by the arrow A).

Figure 11:
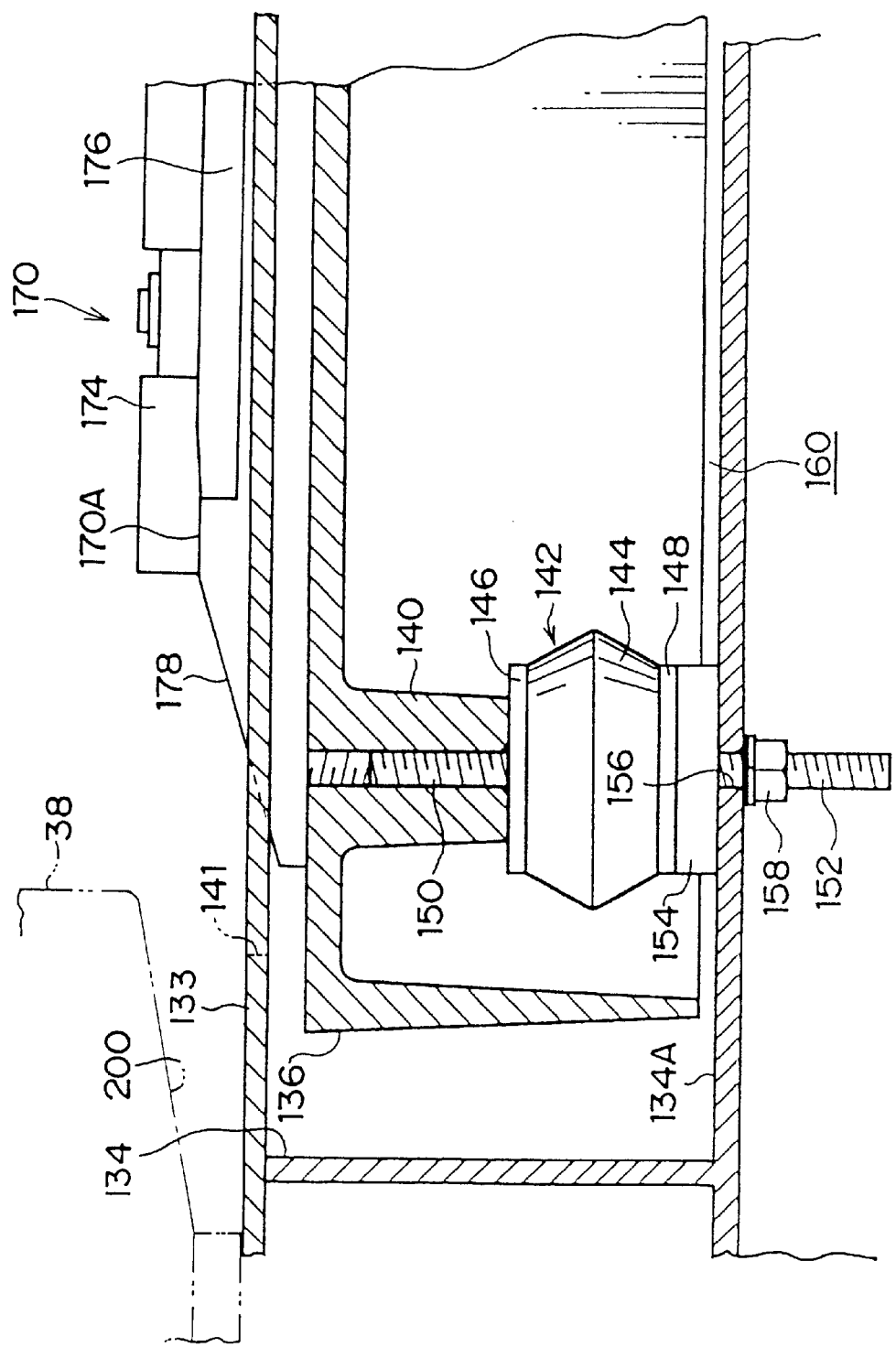
FIG. 11 is an enlarged sectional view showing a vibration isolating member according to the first embodiment of the present invention and the vicinity thereof.

As shown in FIG. 11, a cylindrical portion or a plurality of cylindrical portions 140 each having a substantially cylindrical configuration (in the present embodiment, four cylindrical portions are each provided in the vicinity of the corners of the upper surface of the frame 136) is/are provided so as to extend downwards, i.e., toward the bottom surface 134A of the concave portion 134 of the housing 130, from the upper surface of the frame 136.

A vibration isolating member 142 is provided between each of the cylindrical portions 140 and the bottom surface 134A of the concave portion 134. The frame 136 is supported via the vibration isolating members 142.

The vibration isolating members 142 each include a vibration isolating rubber body 144, circular plates 146 and 148, and shaft portions 150 and 152. The vibration isolating rubber body 144 is substantially cylindrical and is formed in such a manner that the diameter thereof gradually decreases as the vibration isolating rubber body 144 runs from the center thereof toward the ends in the axial direction (i.e., in the vertical direction). The circular plates 146 and 148 are adhered to the top and bottom surfaces of the vibration isolating rubber body 144, respectively. The shaft portions 150 and 152 are provided to protrude upwards and downwards from the centers of the circular plates 146 and 148, respectively. Male threads are formed on the periphery of the shaft portion 150 and engage with female threads formed on the inner surface of the cylindrical portion 140. Male threads are also formed on the shaft portion 152, and the shaft portion 152 is inserted via a spacer 154 through a bore (hole) 156 formed in the bottom surface of the concave portion 134, and a nut 158 is screwed onto the shaft portion 152. In the structure described above, the support frame 45 is supported by the vibration isolating members 142 in such a manner that a predetermined gap 160 is formed between the frame 136 of the support frame 45 and the housing main body frame 131 (in other words, in a state in which the frame 136 of the support frame 45 is substantially not in contact with (floats on) the housing main body frame 131). Further, the reading section 43 is mounted via the housing 130 to the installation frame 122.

Since the plurality of (i.e., four) vibration isolating members are provided in the present embodiment, a plurality of (four) vibration isolating rubber bodies 144, which serve as elastic bodies and form the respective vibration isolating members 142, are also provided. Considering the load from the support frame 45 which acts on the vibration isolating rubber bodies 144, the elastic constant for each of the plurality of vibration isolating rubber bodies 144 is set to a predetermined value so that all of the vibration isolating rubber bodies 144 have the same natural frequency.

Figure 10:
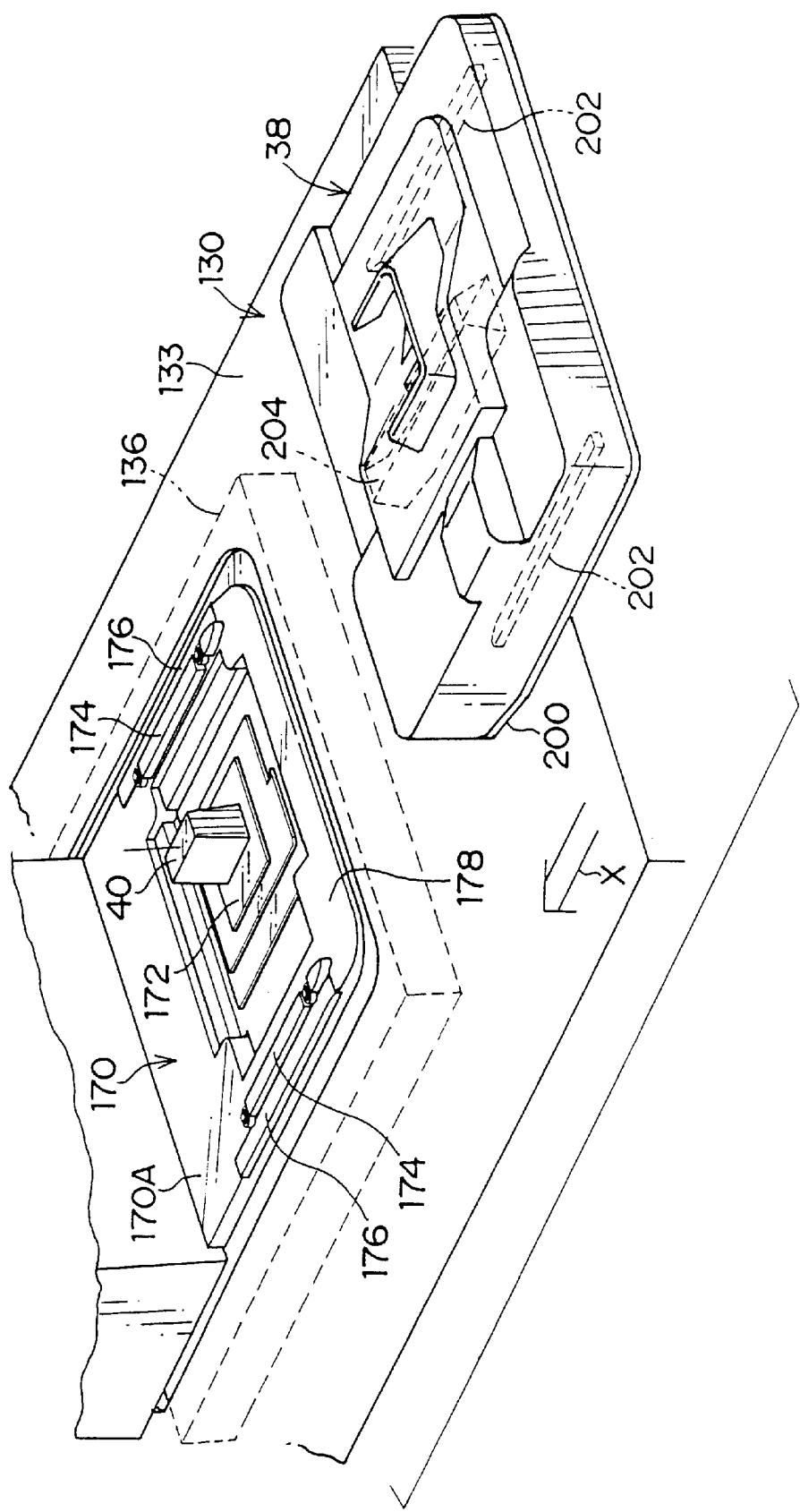
FIG. 10 is a partly enlarged perspective view showing how the film carrier in the image reading apparatus according to the first embodiment of the present invention is mounted.

A carrier stand 170 is formed on the top surface of the frame 136 for installing the film carrier 38. As shown in FIG. 10, the light diffusion box 40 is provided via a plate 172 in an opening (not shown) of the central portion of the carrier stand 170. A guide member 174 and a slide stand 176 for the film carrier 38 are formed on each end of the carrier stand 170.

A plurality of rollers are provided at the guide member 174 for guiding the film carrier 38, which is slid along the slide stand 176, in a predetermined direction.

The top surface 170A of the carrier stand 170, to which surface the film carrier 38 is mounted, is formed at a position which is higher than that of the top plate 133. Accordingly, the film carrier 18 mounted to the top surface 170A is out of contact with the top plate 133.

Further, an inclined surface 178 is formed at an end (corner) portion (at the side toward which the film carrier 38 is to be slid) of the carrier stand 170. The inclined surface 178 is formed so as to be inclined at a predetermined angle from the top surface 170A of the carrier stand 170 to a portion (below the top plate 133 of the work table 27) which is on the top of the frame 136.

A slide member, which is formed from ultra-high-molecular-weight polyethylene with a friction factor smaller than that of the inclined surface 178, is adhered to the inclined surface 178.

At the film carrier 38 which is mounted to the carrier stand 170 in a sliding manner, a tapered surface 200 is formed at an end face thereof so that the end face of the film carrier 38 does not bump against the carrier stand 170 when the film carrier 38 is mounted (slid)(see FIG. 8).

Further, as shown in FIG. 10, a pair of abutment members 202 are provided at the bottom surface of the film carrier 38. Each of the abutment members 202 is prismatic and abuts the outer surface of the guide member 174 of the carrier stand 170. Furthermore, a cut-out portion 204 is provided at the film carrier 38 so that the film carrier 38 and the light diffusion box 40 do not interfere with each other when the film carrier 38 is loaded.

Operation of the Image Reading Apparatus

The operation of the image reading apparatus of the present embodiment will be described next.

In order for the linear CCD scanner 14 to read an image on the photographic film 22, an operator first loads the photographic film 22 in the film carrier 38. Then, the film carrier 38 is slid along the work table 27 (the top plate 133) in the direction indicated by the arrow X (see FIG. 10) toward the carrier stand 170. The tapered surface 200 formed at an end portion of the film carrier 38 is made to ascend the inclined surface 178 formed at an end portion of the carrier stand 170 and reaches the top surface 170A of the carrier stand 170. At the top surface 170A, the abutment members 202 of the film carrier 38 are abutted against the outer surfaces of the guide members 174 respectively, and the film carrier 38 is guided by the guide members 174 in a predetermined direction along the slide stand 176 and is finally mounted (fixed) to the carrier stand 170 at a predetermined position by an unillustrated engagement means. Since the tapered surface 200 of the film carrier 38 is made to ascend the inclined surface 178 formed at the carrier stand 170 and the inclined surface 178 is formed at the position which is lower than the top plate 133, the end portion of the film carrier 38 can be smoothly mounted to the carrier stand 170 without bumping against the end portion of the carrier stand 170.

In this way, the photographic film 22 which has been loaded in the film carrier 38 is set in the linear CCD scanner 14. Of course, a case is also possible in which the film carrier 38 is first set on the work table 27 and the photographic film 22 is loaded in the film carrier 38 thereafter.

In this state, light emitted from the light source section 30 is made into slit light by the light diffusion box 40 and is transmitted through the photographic film 22. Moreover, this light is transmitted through the lens unit 50 and enters the linear CCD 116 such that the image on the photographic film 22 is read thereby.

For example, when one walks on the floor F on which the work table 27 is disposed (see FIGS. 2 and 3) while the image on the photographic film 22 is being read, the floor F vibrates (so-called motion vibration). This vibration is transmitted via the casters 124 and the stoppers 126 to the work table 27. Further, the operation of each member forming the image reading apparatus 10 also causes the work table 27 to vibrate. Since the gap 160 is formed between the support frame 45 and the housing 130, however, vibration of the work table 27 is not transmitted to the support frame 45, and vibration of the support frame 45 and the film carrier 38 is prevented. Although vibration of the work table 27 causes the vibration isolating members 142 to vibrate, energy generated by the vibration is dissipated as thermal energy by elastic deformation of the vibration isolating rubber bodies 144 which form the vibration isolating members 142. Therefore, vibration is not transmitted to the support frame 45, and the support frame 45 and the film carrier 38 are prevented from vibrating.

In this way, since the support frame 45 is prevented from vibrating by the gap 160 and the vibration isolating members 142, the reading section 43 as a whole is also prevented from vibrating. Accordingly, the support frame 45, the film carrier 38 and the like, for example, are not subjected to slight deformation due to vibration, and a predetermined relative positional relationship between the linear CCD 116, the lens unit 50 and the photographic film 22 is maintained. Therefore, so-called color aberration or the like is not generated in the course of reading, for example, and an image on the photographic film 22 can be read with a high reading accuracy.

Further, due to the operator operating the keyboards or the mouse in the course of reading images, impact acts on the housing 128 intermittently (so-called motion impact) and the housing 128 vibrates. However, since the gap 132 is formed between the housing 128 and the housing 130, vibration of the housing 130 is prevented with respect to the housing 128, and therefore, the housing 130 vibrates only slightly. Further, since vibration of the support frame 45 is prevented with respect to the housing 130 by the gap 160 and the vibration isolating members 142, the reading section as a whole is prevented from vibrating, and an image on the photographic film 22 can be read with a high reading accuracy, without color displacement or the like being generated.

Moreover, in the present embodiment, each of the vibration isolating members 142 includes the vibration isolating rubber body 144 made of vulcanized rubber. Since vulcanized rubber in general has high internal friction, vibration can be damped effectively. Furthermore, vibration characteristics of the vibration isolating rubber body 144 can also be made such that high frequency vibration (for example, a frequency of 100 Hz and near 100 Hz), which particularly affects the accuracy of reading images in the linear CCD scanner 14 such as that of the present embodiment, is damped effectively.

Further, in the present embodiment, the vibration isolating rubber bodies 144 respectively have a predetermined elastic constant and the same natural frequency, considering the load from the support frame 45 which acts on the vibration isolating rubber bodies 144. Therefore, vibration of the support frame 45 can be prevented more effectively.

In the carrier mounting structure which effectively prevents vibration as described above, in particular, mounting work is easy in the present embodiment since the film carrier 38 can be slid along the top plate 133 of the work table 27 and mounted to the carrier stand 170. Moreover, when the film carrier 38 is mounted to the carrier stand 170, the tapered surface 200 of the film carrier 38 is guided by the inclined surface 178 provided at an end portion of the carrier stand 170 and is therefore mounted smoothly. In other words, when the film carrier 38 is mounted to the carrier stand 170, the end portion of the film carrier 38 does not bump against the end portion of the carrier stand 170, and therefore, vibration is not imparted to the carrier stand 170. Further, since the slide member with a friction factor smaller than that of the inclined surface 178 is adhered to the inclined surface 178, sliding of the film carrier 38 is made much easier.

When a vibration is imparted to the carrier stand 170, the whole support frame 45 vibrates via the frame 136. Accordingly, the concern has existed that the vibration of the support frame 45 and the film carrier 38 will not converge at the time of reading images, thereby resulting in deterioration in image reading accuracy.

On the contrary, in the present embodiment, the film carrier 38 can be smoothly mounted to the top surface 170A by causing the film carrier 38 to ascend onto the inclined surface 178 of the carrier stand 170, sliding the film carrier 38 along the top plate 133 of the work table 27. Namely, the film carrier 38 can be mounted to the carrier stand 170 without being bumped against the carrier stand 170, and therefore, the carrier stand 170 (the support frame 45) is not caused to vibrate when the film carrier 38 is mounted to the carrier stand 170. As a result, a predetermined image reading accuracy can be ensured.

If the top plate 133 is higher than the carrier stand 170, similar operation and effect can be obtained by forming an inclined surface which is inclined toward the carrier stand 170 and which is formed on the top of the frame 136. In such a case, it is preferable that an end portion of the inclined surface is formed higher than the upper surface of the carrier stand 170, therefore the film carrier 38 does not bump against the corner of the carrier stand 170 when the film carrier 38 is slid along the top surface 133.

In addition, when the film carrier 38 is mounted to the carrier stand 170, the carrier stand 170 or the like is not subjected to impact from a bump or the like. Therefore, the vibration isolating rubber bodies 144 which form the vibration isolating members 142 can be prevented from being excessively deformed elastically and fractured.

Figure 12:
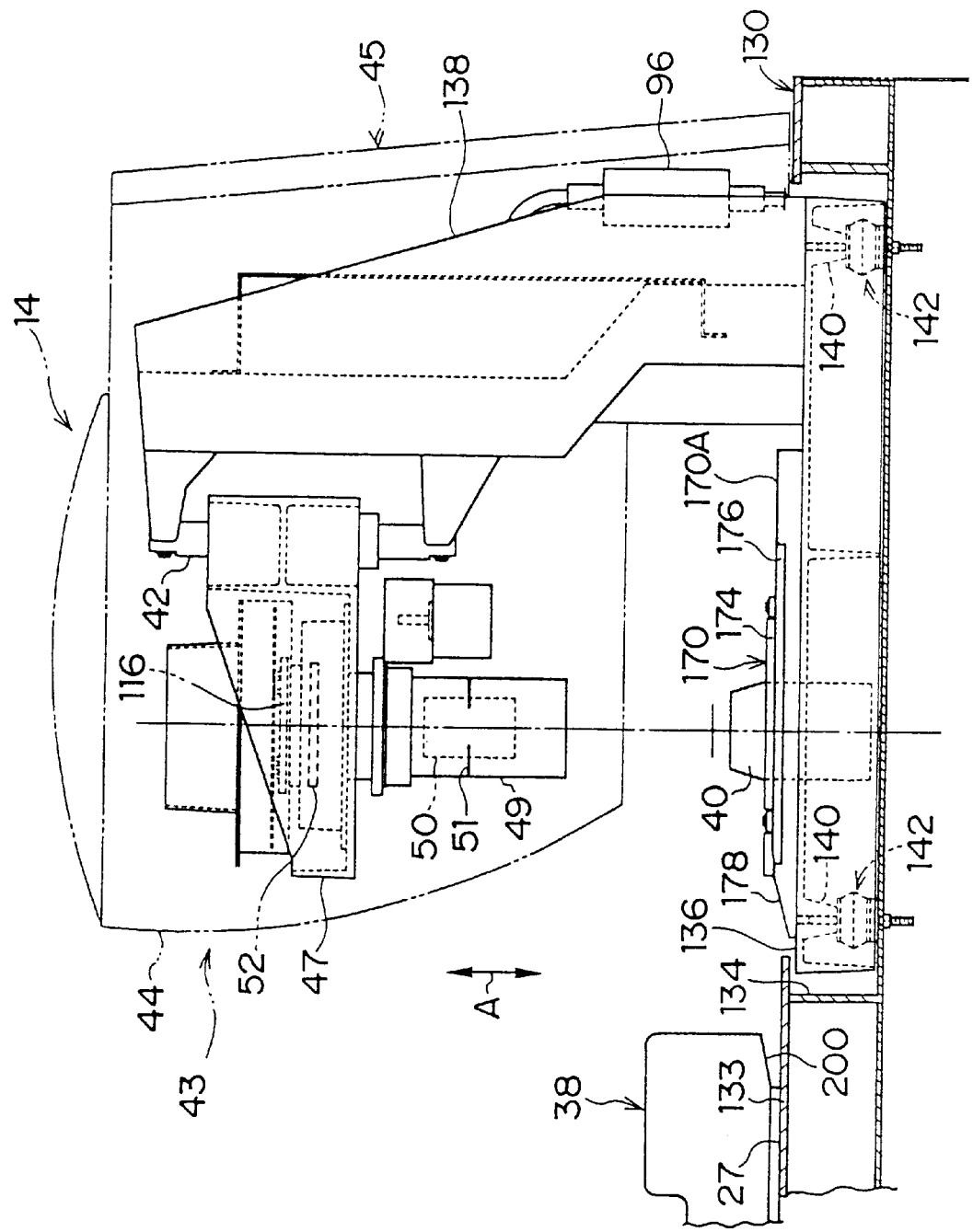
FIG. 12 is an overall schematic diagram showing a carrier mounting structure in the image reading apparatus according to the second embodiment of the present invention.
Figure 13:
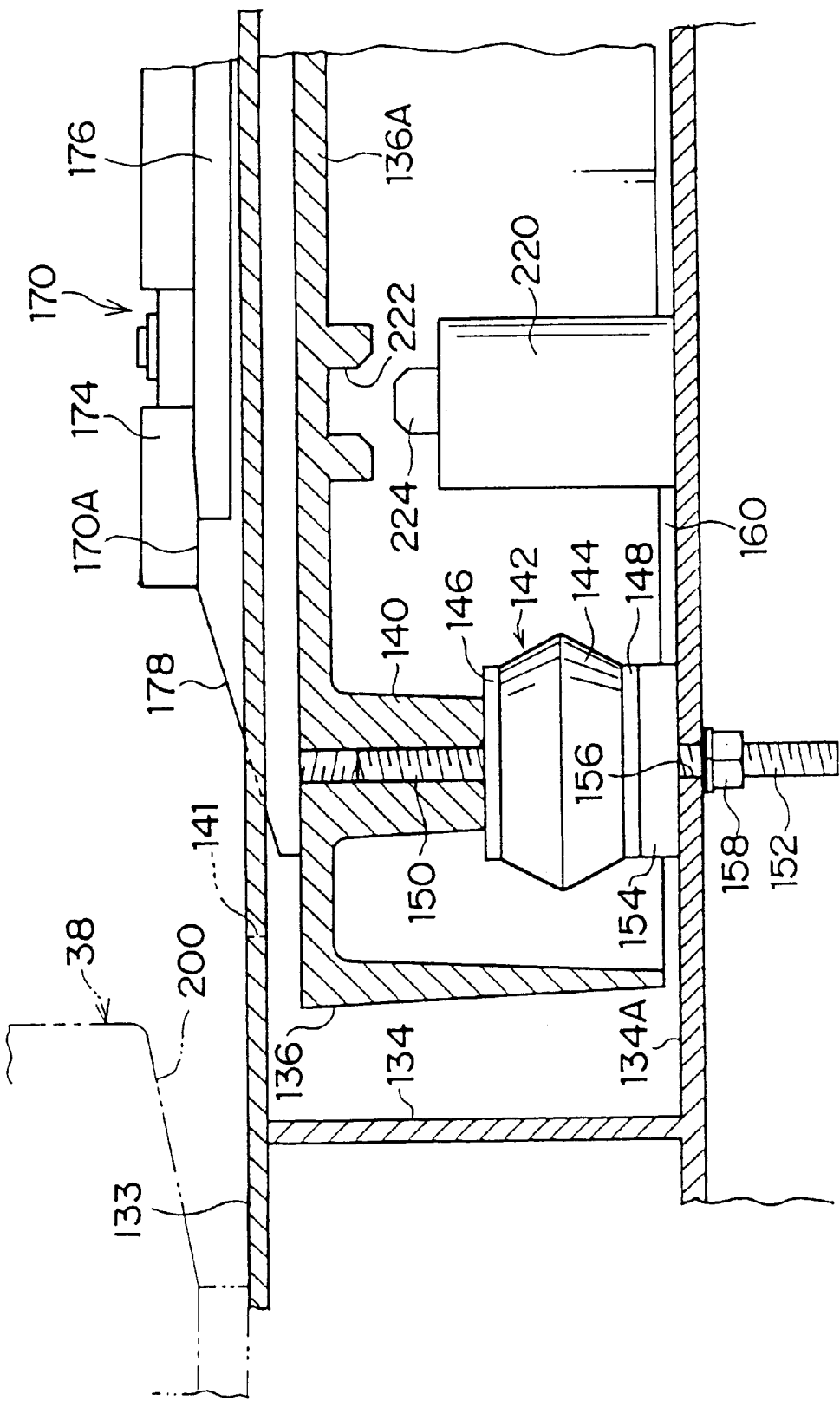
FIG. 13 is an enlarged sectional view showing the vicinity of a vibration isolating member and a solenoid according to the second embodiment of the present invention.

Next, an image reading apparatus, to which a carrier mounting structure according to a second embodiment is applied, will be described with reference to FIGS. 12 and 13. Components of the second embodiment which are similar to those of the first embodiment are designated by the same reference numerals, and a detailed description thereof is omitted. The schematic structure of the image reading apparatus is substantially the same as that shown in FIGS. 1 through 7, and therefore, a description thereof is omitted.

The carrier mounting structure according to the second embodiment is different from the carrier mounting structure according to the first embodiment in that a solenoid or a plurality of solenoids 220 (four in the present embodiment) is/are each provided near the respective vibration isolating members 142 provided on the bottom surface 134A of the concave portion 134.

Further, concave portions 222 are provided on the underside of the upper plate 136A of the frame 136 such that respective plungers 224 are inserted into the concave portions 222 by energizing the solenoids 220. The cross-sectional configuration of the plunger 224 is substantially the same as that of the concave portion 222.

The operation of the present second embodiment will be described next.

As in the first embodiment, the film carrier 38 is slid along the top plate 133 of the work table 27 toward the carrier stand 170. The tapered surface 200 of the film carrier 38 is guided by the inclined surface 178 of the carrier stand 170, such that the film carrier 38 is mounted to the top surface 170A of the carrier stand 170. At this time, the solenoids 220 are energized, and the plungers 224, each having a circular cross-section, are inserted into the respective concave portions 222 on the upper plate 136A of the frame 136. Since the cross-sectional configuration of the concave portion 224 is substantially the same as that of the plunger 224, little play (clearance) exists between the concave portion 222 and the plunger 224. Therefore, movement of the carrier stand 170 in the horizontal direction thereof can be prevented by the plungers 224 being inserted into the respective concave portions 222. For example, even when some impact is applied to the carrier stand 170 by the work of mounting the film carrier 38 to the carrier stand 170, the carrier stand 170 does not move in the horizontal direction. Further, vibration generated by this impact does not excessively deform elastically or fracture the vibration isolating rubber bodies 144 which form the vibration isolating members 142.

When mounting of the film carrier 38 to the carrier stand 170 is finished, the solenoids 220 are de-energized and the plungers 224 are released from the concave portions 222, so that the frame 136 is free to move in the horizontal direction thereof. Accordingly, vibration of the support frame 45 and the film carrier 38 is prevented by the vibration isolating members 142, and images can be read with an excellent reading accuracy.

In the present second embodiment, four of the solenoids 220 are respectively provided on the bottom surface 134A of the concave portion 134 near the vibration isolating members 142. However, one solenoid 220 may be provided at the central portion of the bottom surface 134A, or any other number of the solenoids 220 may be provided. Moreover, although the cross-sectional configuration of the concave portion 222 is circular in the present second embodiment, the cross-sectional configuration of the concave portion 222 can also be rectangular such that movement of the frame 136 only in the longitudinal and vertical directions of the ellipse can be prevented.

Further, energization of the solenoids 220 (insertion of the plungers 224 into the respective concave portions 222) is effected only when the film carrier 38 is mounted to the carrier stand 170. Inversely, however, it is also possible to control the solenoids 220 such that the solenoids 220 are de-energized (i.e., the plungers 224 are released from the concave portions 222) only when images are being read.

Namely, as shown in FIG. 17, the solenoids 220 can be de-energized only during pre-scan and fine scan. With this manner, no load is given to the vibration isolating rubber bodies 144 except the time during the image reading. Accordingly, the period of endurance (life) of the vibration isolating rubber bodies 144 is extended, which is advantageous from the standpoint of cost.

The de-energization of the solenoids 220 needs to be effected faster than the driving of the linear CCD 116 by a predetermined time (see A and C in FIG. 17) so that the vibration of the carrier stand 170 is made to converge. Further, it is preferable that the energization of the solenoids 220 is effected after stopping driving of the linear CCD 116 by a predetermined time (see B and D in FIG. 17).

Figure 14:
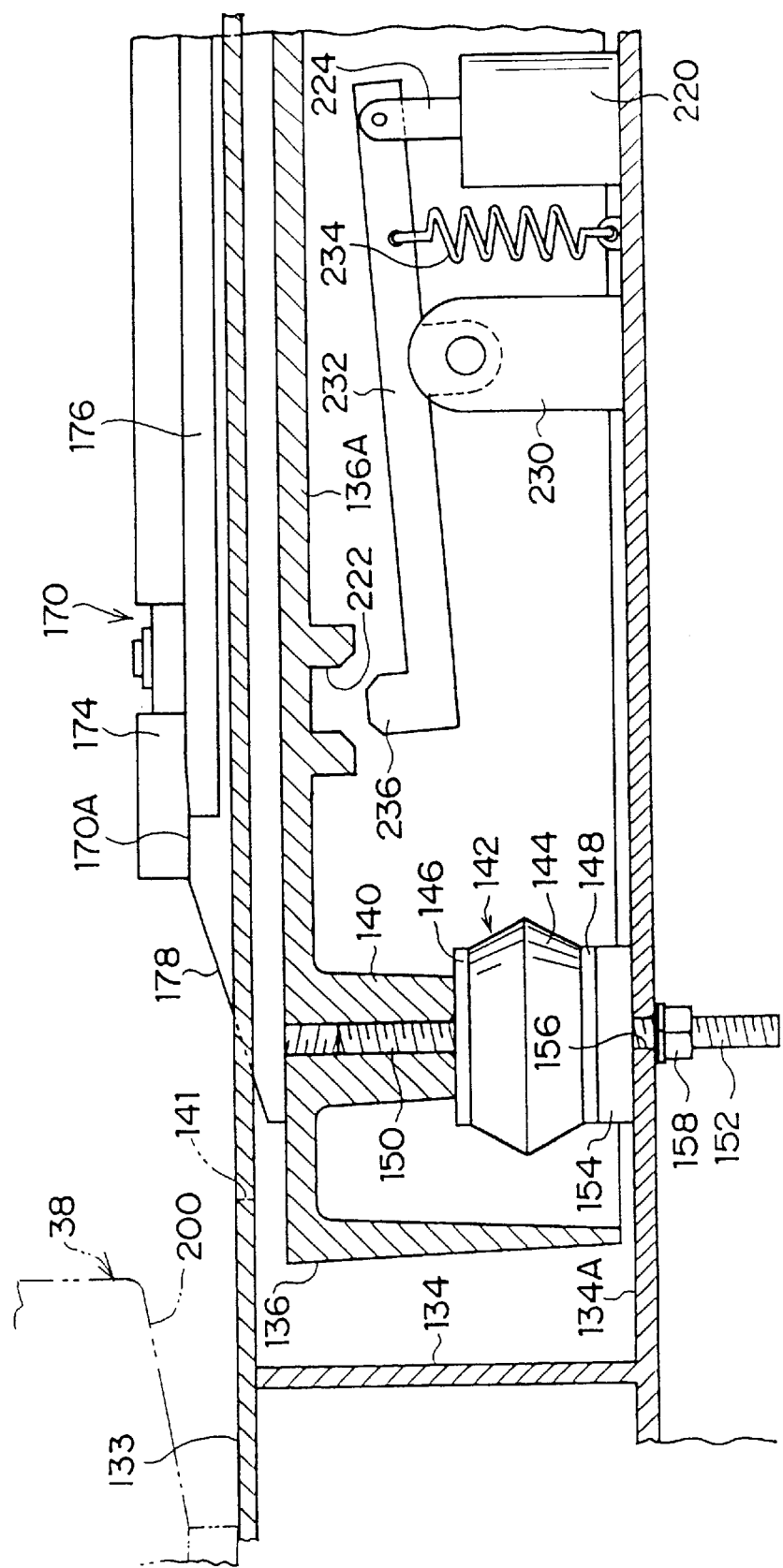
FIG. 14 is an enlarged sectional view showing the vicinity of the vibration isolating member and the solenoid according to the second embodiment of the present invention.

A structure such as that shown in FIG. 14 is also possible instead of the structure in which the plungers 224 of the solenoids 220 are directly inserted into the respective concave portions 222. Namely, a support member 230 is formed upright on the bottom surface 134A of the concave portion 134, and a swing member 232 is swingably supported by the support member 230. One end of the swing member 232 engages with the plunger 224 of the solenoid 220, and a portion of the swing member 232, which is at the one end side of the swing member 232 (which is located between the one end of the swing member 232 and a vicinity of a supporting portion at which the swing member 232 is supported by the support member), engages with the bottom surface 134A via a spring 234. A convex portion 236 having a circular cross section is formed at the other end of the swing member 232. Accordingly, the convex portion 236 is inserted into the concave portion 222 by energizing the solenoid 220, thereby making it possible to prevent vibration of the frame 136 in the horizontal direction thereof.

With the above-mentioned structure, the convex portion 236 can be inserted into the concave portion 222 even if the amount of displacement of the plunger 224 of the solenoid 220 is small. Therefore, vibration of the frame 136 in the horizontal direction thereof can be prevented.

Figure 15:
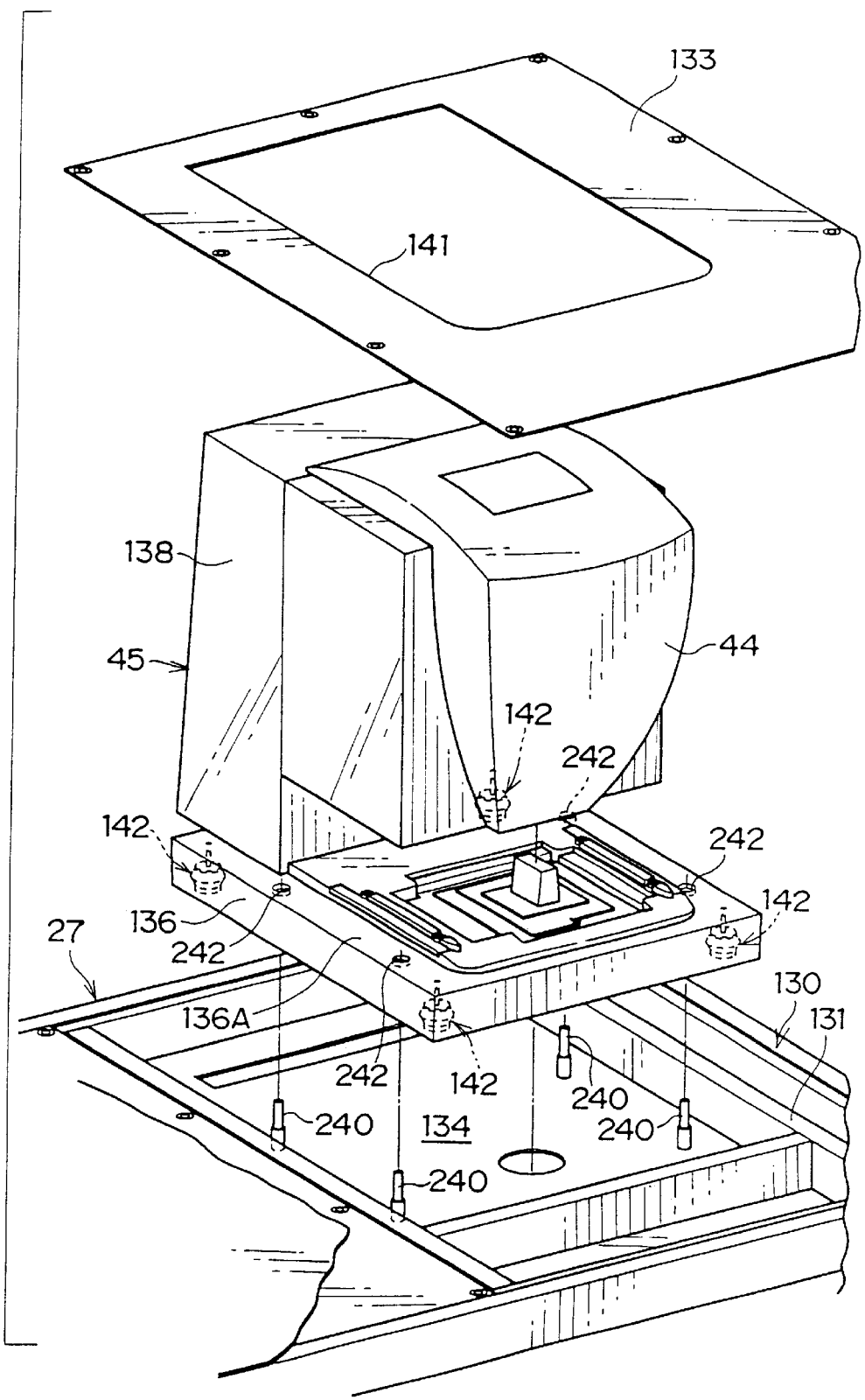
FIG. 15 is an exploded perspective view showing a carrier mounting structure in the image reading apparatus according to the third embodiment of the present invention.

Next, an image reading apparatus, to which the carrier mounting structure according to a third embodiment is applied, will be described with reference to FIGS. 15 and 16. Components of the third embodiment which are similar to those of the first embodiment are designated by the same reference numerals, and a detailed description thereof is omitted. The schematic structure of the image reading apparatus is substantially the same as that shown in FIGS. 1 through 7, and therefore, a description thereof is omitted.

What is different from the carrier mounting structure in the first embodiment is that a pin member or a plurality of pin members 240 (four in the present third embodiment) is/are provided upright on the bottom surface 134A of the concave portion 134, and that holes 242 are formed in the upper plate 136A of the frame 136, each hole 242 corresponding to each of the pin members 240.

Figure 16:
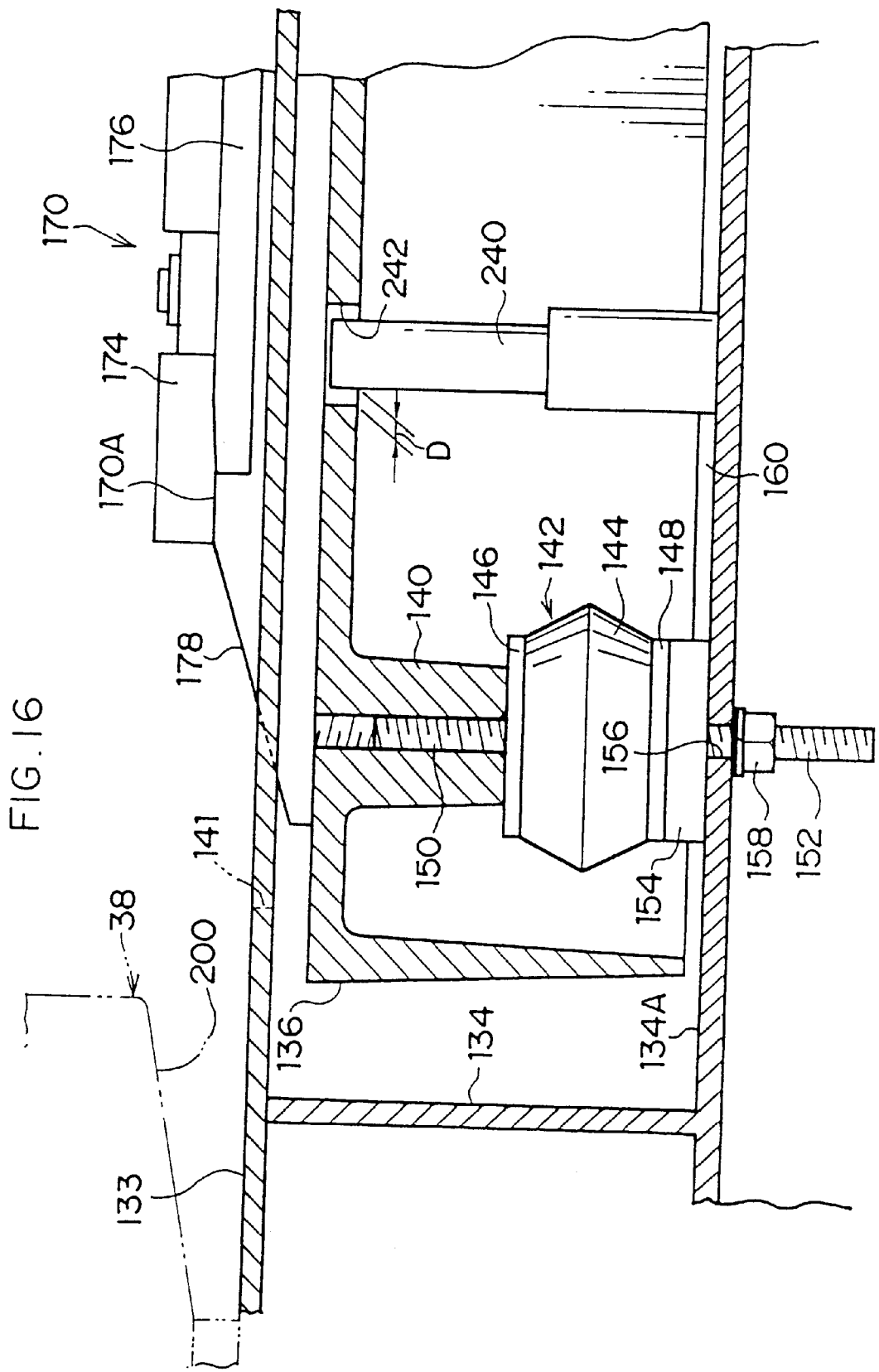
FIG. 16 is an enlarged sectional view showing the vicinity of a vibration isolating member and a solenoid according to the third embodiment of the present invention.

The diameter of the circular hole 242 is formed so as to be larger than the diameter of the pin member 240 having a circular cross section by a predetermined clearance D (see FIG. 16).

Accordingly, even if impact is applied to the carrier stand 170 (the frame 136, the support frame 45), displacement of the frame 136 in the horizontal direction thereof is limited (the amount in which the frame 136 can be displaced=the clearance D), and therefore, excessive displacement of the frame 136 in the horizontal direction thereof is prevented. Accordingly, it is possible to prevent the vibration isolating rubber bodies 144 which form the vibration isolating members 142 from being excessively deformed elastically and fractured.

Moreover, similar operation and effect are obtained by providing the hole in the bottom surface 134A of the concave portion 134 and providing the pin member 240 at the upper plate 136A of the frame 136.

Further, since the amplitude (the amount of displacement) of the frame 136 is limited, the vibration converges quickly when the frame 136 is caused to vibrate.

The pin members 240 and the holes 242 are provided as the regulating means in the present third embodiment. However, a structure is also possible in which a stopper member is mounted to the concave portion 134 so as to control (limit) the amount of displacement of the frame 136.

Furthermore, descriptions have been given of the image reading apparatus according to the second and third embodiments on the premise that the film carrier 38 is mounted to the carrier stand 170 in a sliding manner. However, the carrier mounting structure in accordance with the present invention is also applicable to a type in which the film carrier 38 is mounted to the carrier stand 170 in a non-sliding manner.

The vibration isolating rubber bodies 144 have been presented as the vibration isolating structure in the first through third embodiments, but the vibration isolating structure is not limited to the same. Any type of members, such as springs, can be used as the vibration isolating structure so long as they do not transmit the vibration of the main body of the image reading apparatus to the support frame 45.

In the first aspect of the present invention, since the carrier is slid along the inclined surface and is mounted to the carrier mounting portion, the vibration isolating rubber can be prevented from being excessively deformed and fractured. Accordingly, image information on the image information carrying member, which is loaded in the carrier, can be read with a high reading accuracy.

In the second aspect of the present invention, by temporarily securing the carrier mounting portion (image reading means) to the main body of the image reading apparatus with use of the securing means when the carrier is mounted to the carrier mounting portion, a case can be prevented in which the vibration isolating rubber is excessively deformed elastically and fractured by the impact generated at the time of mounting of the carrier. Further, by canceling the securing after the carrier is mounted to the carrier mounting portion, in a third aspect of the present invention, the image reading means and the carrier mounting portion (the carrier) are prevented from vibration by the vibration isolating rubber. Therefore, image information on the image information carrying member, which is loaded in the carrier, can be read with a high reading accuracy.

In the fourth aspect of the present invention, the amplitude of the vibration of the carrier mounting portion is restricted by the regulating means. Accordingly, such a case can prevent fracture of the vibration isolating structure.

What is claimed is:

1. A carrier mounting structure which includes image reading means mounted to a main body of an image reading apparatus via a vibration isolating structure which alleviates effects of vibration from outside, and a carrier mounting portion which is formed at a reading position of the image reading means and to which a carrier having an image information carrying member loaded therein is mounted, said carrier mounting structure comprising:

an upper surface of the main body of the image reading apparatus along which surface a bottom surface of the carrier is slid;

a mounting surface of said carrier mounting portion, which is formed at a position different from said upper surface in a vertical direction and to which the carrier is mounted; and an inclined surface which guides the carrier from said upper surface to said mounting surface.

2. A carrier mounting structure according to claim 1, wherein a slide member with a friction factor smaller than that of said inclined surface is adhered to said inclined surface.

3. A carrier mounting structure according to claim 1, said carrier mounting structure further comprising:

a regulating mechanism for restricting the amplitude of the vibration of said carrier mounting portion.

4. A carrier mounting structure according to claim 3, wherein said regulating mechanism includes a hole portion formed in one of said carrier mounting portion or the main body of the image reading apparatus and a pin member provided at the other of said carrier mounting portion or the main body of the image reading apparatus and inserted into said hole portion, said pin member having a cross-sectional area which is smaller than that of said hole portion.

5. A carrier mounting structure according to claim 1, wherein said mounting surface of said carrier mounting portion is formed at a position higher than said upper surface of the main body of the image reading apparatus, and said inclined surface is formed at a corner portion of said carrier mounting portion and is inclined toward said mounting surface of said carrier mounting portion from a position which is lower than said upper surface of the main body of the image reading apparatus.

6. A carrier mounting structure which includes image reading means mounted to a main body of an image reading apparatus via a vibration isolating structure which alleviates effects of vibration from outside, and a carrier mounting portion which is formed at a reading position of the image reading means and to which a carrier having an image information carrying member loaded therein is mounted, said carrier mounting structure comprising:

securing means for temporarily securing said carrier mounting portion to the main body of the image reading apparatus;

wherein said securing means comprises an engaged member formed at said carrier mounting portion and an engaging member provided at the main body of the image reading apparatus and formed so as to be insertable into and releasable from said engaged member;

wherein said engaging member comprises an engaging portion which engages with said engaged member and a driving member which drives said engaged portion; and wherein said engaging member further comprises:

a swing member in which said engaging portion is provided at one end thereof and in which said driving member is engaged at the other end thereof; and a support member provided at the main body of the image reading apparatus for swingably supporting said swing member.

7. A carrier mounting structure which includes an image reading section mounted to a main body of an image reading apparatus via a vibration isolating structure which alleviates effects of vibration from outside, and a carrier mounting portion which is formed at a reading position of the image reading section and to which a carrier having an image information carrying member loaded therein is mounted, said carrier mounting structure comprising:

an upper surface of the main body of the image reading apparatus;

a mounting surface of said carrier mounting portion, which is formed at a position different from said upper surface in a vertical direction, and to which the carrier is mounted; and an inclined surface which guides the carrier from said upper surface to said mounting surface.

8. A carrier mounting structure as claimed in claim 7, further comprising:

a regulating mechanism for restricting an amplitude of the vibration of said carrier mounting portion, wherein said regulating mechanism includes a hole portion formed in one of said carrier mounting portion or the main body of the image reading apparatus and a pin member provided at the other of said carrier mounting portion or the main body of the image reading apparatus and inserted into said hole portion, said pin member having a cross-sectional area which is smaller than that of said hole portion, and a clearance between said pin member and said hole portion is determined such that said vibration isolating structure is prevented from being deformed more than the clearance between said pin member and said hole portion.

9. A carrier mounting structure as claimed in claim 7, further comprising:

a regulating mechanism for restricting the amplitude of the vibration of the image reading section on which the carrier mounting portion is formed, wherein said regulating mechanism includes a hole portion formed in one of said image reading section or the main body of the image reading apparatus and a pin member provided at the other of the image reading section or the main body of the image reading apparatus and inserted into said hole portion, said pin member having a cross-sectional area which is smaller than that of said hole portion, and a clearance between the pin member and the said hole portion is determined such that said vibration isolating structure is prevented from being deformed more than the clearance between the pin member and the said hole portion.

\* \* \* \* \*